US00RE37300E

(19) United States
(12) Reissued Patent
Nagato et al.

(10) Patent Number: US RE37,300 E
(45) Date of Reissued Patent: Jul. 31, 2001

(54) PRESSURIZED INTERNAL CIRCULATING FLUIDIZED-BED BOILER

(75) Inventors: Shuichi Nagato, Yokohama; Masayuki Horio, Chofu; Takahiro Oshita, Yokohama; Norihisa Miyoshi, Sodegaura; Seiichiro Toyoda, Tokyo; Akira Shimokura, Yokohama; Tomoyuki Shinano, Yokohama; Shugo Hosoda, Yokohama, all of (JP)

(73) Assignee: Ebara Corporation, Tokyo (JP)

(21) Appl. No.: 09/073,062

(22) Filed: May 6, 1998

Related U.S. Patent Documents

Reissue of:
(64) Patent No.: 5,513,599
Issued: May 7, 1996
Appl. No.: 08/204,096
Filed: Mar. 2, 1994

(30) Foreign Application Priority Data

Mar. 3, 1993 (JP) ..... 5-065985

(51) Int. Cl.[7] ..... B09B 3/00; F22B 1/00
(52) U.S. Cl. ..... 122/4 D; 60/39.464; 422/146
(58) Field of Search ..... 122/4 D; 60/39.464; 110/245; 422/146

(56) References Cited

U.S. PATENT DOCUMENTS 4,823,740 * 4/1989 Ohshita et al. ..... 122/4 D
4,938,170 * 7/1990 Ohshita et al. ..... 122/4 D
5,052,344 * 10/1991 Kosugi et al. ..... 122/4 D
5,138,982 * 8/1992 Ohshita et al. ..... 122/4 D
5,156,099 * 10/1992 Ohshita et al. ..... 110/245
5,313,913 * 5/1994 Ohshita et al. ..... 122/4 D
5,634,516 * 6/1997 Myöhänen et al. ..... 122/4 D X

FOREIGN PATENT DOCUMENTS

2072524 * 10/1981 (GB) .

OTHER PUBLICATIONS

Miller et al., "Technical Evaluation: Pressurized Fluidized–Bed Combustion Technology", no date Fossil Energy Program, Argonne Natiounal Laboratory, ANL/FE 81–65, pp. 107–108, no date.*

(List continued on next page.)

*Primary Examiner*—Harry B. Tanner
(74) *Attorney, Agent, or Firm*—Wenderoth, Lind & Ponack, L.L.P.

(57) ABSTRACT

A pressurized internal circulating fluidized-bed boiler is incorporated in a combined-cycle electric generating system in which a fuel such as coal, petro coke or the like is combusted in a pressurized fluidized bed and an exhaust gas produced by the combusted fuel is introduced into a gas turbine. The pressurized internal circulating fluidized-bed boiler includes a pressure vessel, a combustor disposed in the pressure vessel and a main fluidized bed combustion chamber provided with an air diffusion device. A thermal energy recovery chamber is partitioned from the main combustion chamber by an inclined partition wall. A fluidized medium flows into and out of the main combustion chamber and the thermal energy recovery chamber. A free board is provided integrally above the main combustion chamber and the thermal energy recovery chamber so that combustion gas from the main combustion chamber and the thermal energy recovery chamber is mixed in the free board.

92 Claims, 14 Drawing Sheets

OTHER PUBLICATIONS

"PFBC and a new eral for coal arise from mothballed plant", Journal of Power, Apr. 1991, pp. 102–108.*

Kinsinger, "PFBC System Modularity", Journal of Proceedings of the American Power Conference, pp. 646–650, no date.*

Ishimoto et al., "Practical Use of IHI's Pressurized Fluidized–Bed–Boiler", Technical News published by Ishikawajima Harima Industry Co., vol. 31–5, pp. 301–308, Sep. 1991.*

Ishigaki et al., "The present technique of Pressurized Fluidized Bed", Journal of Chemical Device, pp. 51–58, Feb. 1991.*

Keairns et al., "Circulating–Bed Boiler Concepts for STeam and Power Generation", Proc. 13th Intersoc. Energy Conversion Eng. Conf. (Paper No. 789336), vol. 1, pp. 540–547, no date.*

* cited by examiner

PRESSURIZED INTERNAL CIRCULATING FLUIDIZED-BED BOILER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a pressurized internal circulating fluidized-bed boiler, and more particularly to a pressurized internal circulating fluidized-bed boiler for use in a pressurized fluidized-bed combined-cycle electric generating system in which a fuel such as coal, petro coke, or the like is combusted in a pressurized fluidized bed and an exhaust gas produced by the combusted fuel is introduced into a gas turbine.

2. Description of the Prior Art

Efforts to reduce the emission of carbon dioxide from various sources are important in view of environmental damages that are being caused by air pollution which appears to be more and more serious on the earth. It is conjectured that coal will have to be relied upon as a major energy resource because greater dependency on nuclear and oil energies is not favorable at present. To suppress carbon dioxide emission and provide a substitute for oil and nuclear power, there has been a demand for a highly efficient, compact electric generating system which is capable of utilizing coal combustion to generate a clean energy.

To meet such a demand, atmospheric fluidized-bed boilers (AFBC) capable of burning coals of different kinds for electric generation have been developed because a stable energy supply cannot be achieved by pulverized coal boilers which pose a limitation on available coal types.

However, the atmospheric fluidized-bed boilers (AFBC) fail to perform the functions that have been expected. In addition, since only steam turbines can be combined with the atmospheric fluidized-bed boilers, there are certain limitations on attempts to increase the efficiency and energy output of the atmospheric fluidized-bed boilers. These disadvantages of the atmospheric fluidized-bed boilers have directed research and development trends toward pressurized fluidized-bed boilers (PFBC) that make it possible to construct combined-cycle electric generating systems with gas turbines.

Further, there has been researched a coal gasification combined-cycle electric generating system in which coal is converted into gas and a refined gas purified by removing dust particles is supplied to a gas turbine. The coal gasification combined-cycle electric generating system, incorporating an air-cooled gas turbine which uses exhaust gas of 1300° C., has a target efficiency of 47.1% at a generating end.

On the other hand, the pressurized bubbling type fluidized-bed boilers with a capacity over 80 MWe are already in operation overseas as demonstration or commercial models and, in addition, has an advantage that a desulfurization equipment is not required. However, the coal gasification electric generating system is superior to the pressurized fluidized-bed combined-cycle electric generating system in efficiency. Thus, a topping-cycle combined electric generating system which has advantages of both systems and higher efficiency has been researched.

The topping-cycle combined electric generating system, comprises a gasifier in which coal is decomposed into coal gas and char, and an oxidizer comprising a fluidized-bed boiler in which char produced in the gasifier is combusted. The coal gas produced in the gasifier and the exhausted gas produced by combustion of char in the oxidizer are mixed and combusted at the inlet of a gas turbine to thereby produce high-temperature gas. The produced high-temperature gas is then supplied to the gas turbine which drives an electric generator coupled thereto.

Conventionally, the pressurized fluidized-bed boilers with a capacity over 80 MWe which are in operation as demonstration or commercial models are made up of pressurized bubbling type fluidized-bed boilers.

However, the pressurized bubbling type fluidized-bed boiler has the following disadvantages.

(A) Disadvantage in load control

The pressurized bubbling type fluidized-bed electric generating system is controlled to meet a load imposed thereon by varying the height of the fluidized bed in the combustor. More specifically, the fluidized medium is drawn from the combustor into the storage container to change heat transfer area of the heat transfer tube, thereby controlling the steam generation to meet the load. When the heat transfer surfaces of the heat transfer tube are exposed to the gas, the heat transfer coefficient thereof is lowered, and hence the amount of heat recovered is lowered. Since the exhaust gas emitted from the fluidized bed is cooled by the exposed heat transfer surfaces, the temperature of the exhaust gas supplied to the gas turbine is lowered, thus reducing the output energy of the gas turbine.

However, the above control process is disadvantageous in that the bed material storage container is necessary to withdraw and return the high-temperature fluidized medium from and into the combustor, it is not easy to withdraw and return the fluidized medium at high temperature and pressure, and agglomeration tends to occur when the fluidized medium of high heat capacity are taken into and out of the bed material storage container.

Furthermore, since the pressurized fluidized-bed boiler is under pressure, the heat transfer tube in a splash zone of the fluidized bed is more subject to erode than that in the atmospheric fluidized-bed boilers (AFBC). Another problem is that an large amount of carbon monoxide is produced because an exhaust gas emitted from the fluidized bed is cooled by the heat transfer tube and the exhaust gas remains in the fluidized bed for a short period of time as the height of the fluidized bed is reduced in the time of low load.

(B) Large-sized pressure vessel conventionally, the pressurized bubbling type fluidizedbed boiler comprises square combustors 146 accommodated in a circular pressure vessel 145 in a plan view as shown in FIG. 14. Therefore, a useless space is defined between the combustors 146 and the pressure vessel 145, resulting in a large-sized pressure vessel and increasing the construction cost of the boiler.

In other to solve the above problems, Mr. Jim Anderson of A.B.B Carbon, A.B. proposed a certain pressurized bubbling type fluidized-bed boiler in principles and design philosophy for a 350 MWe PFBC module. The pressurized bubbling type fluidized-bed boiler is constructed by combining diamond-shaped three combustors 147 to form a hexagonal profile in a plan view as shown in FIG. 15. Assemblage of the combustors 147 which is brought close to a circular shape is accommodated in a circular pressure vessel 145. A useless space between the combustors 147 and the pressure vessel 145 is reduced and the pressure vessel is downsized. The reason for the above structure is that arrangement of heat transfer tubes is complicated in the pressurized bubbling type fluidized-bed boiler having a cylindrical combustor.

Further, since the bed material storage container and pipes are necessary to withdraw and return the high-temperature fluidized medium from and into the combustor, housing of bed material storage container and the pipes inside the pressure vessel makes the pressure vessel large.

(C) Erosion of the heat transfer tube

In the conventional pressurized bubbling type fluidized-bed boiler, the heat transfer tube is more subject to erode, because the heat transfer tube is disposed in the fluidized bed where the fluidized medium is intensely fluidized. Therefore, the heat transfer tube is required to have surface treatment like thermal spraying.

(D) Complicated fuel supplying system

In the conventional pressurized bubbling type fluidized-bed boiler, fuel such as coal is insufficiently dispersed horizontally in the fluidized bed. In order to avoid nonuniform combustion, many fuel feeding pipes must be installed in the boiler, resulting in a complicated fuel supplying system. Further, it is difficult to supply fuel such as coal to each of the fuel feeding pipes uniformly. Unbalanced supply of fuel causes nonuniform combustion and generates agglomeration, resulting in shutdown of the boiler.

(E) Wear of limestone

In the conventional pressurized fluidized-bed electric generating system, limestone is mixed with the fluidized medium for desulfurization. However, the limestone wears rapidly, and is scattered as ash from the dust collector without sufficiently contributing to the desulfurizing action. The conventional pressurized fluidized-bed electric generating system fails to achieve a high desulfurization rate that are required by power plants. The conventional pressurized bubbling type fluidized-bed requires plenty of desulfurizing agent in order to obtain high desulfurization rate, and then produces a vast amount of ashes.

On the other hand, in the topping-cycle combined electric generating system, the fluidized-bed boiler which is used as an oxidizer has the same disadvantages as mentioned above.

Further, a fixed-bed gasifier is disadvantageous in that coal tar remains in the fixed bed, and an entrained flow gasifier is disadvantageous in that ash-sticks occurs because of high temperature reaction. On the contrary, a fluidized-bed gasifier has advantages that coal tar does not remain, ash-sticks does not occur and desulfurization is performed in the fluidized bed, because it is in operation at the intermediate temperature of the above two types of gasifier. However, the bubbling type fluidized-bed gasifier has the same disadvantages as enumerated in (A)–(D).

SUMMARY OF THE INVENTION

It is therefore an object of the present invention to provide a pressurized internal circulating fluidized-bed boiler for a combined-cycle electric generating system, which can be controlled to meet a load without varying the height of a fluidized bed, prevents agglomeration, minimize the emission of carbon monoxide and nitrogen oxide, and can increase a limestone utilization ratio and a desulfurization rate.

According to one aspect of the present invention, there is provided a pressurized internal circulating fluidized-bed boiler for use in a combined-cycle electric generating system, comprising: a pressure vessel; a combustor disposed in the pressure vessel; a main fluidized bed combustion chamber having an air diffusion device provided at the bottom of the combustor and adapted to inject fluidizing air upwardly under a mass flow that is at least greater at one side than that at another side; an inclined partition wall provided above a portion of the air diffusion device where the mass flow is greater so as to interfere with the upward flow of the fluidizing air and thereby to deflect the air towards a portion above the another side of the air diffusion device where the mass flow is smaller; a thermal energy recovery chamber partitioned from the main combustion chamber by the inclined partition wall; a heat transfer surface means provided in the thermal energy recovery chamber for a passage of a heat receiving fluid therethrough; an air diffuser provided at a lower portion of the thermal energy recovery chamber; and a free board provided integrally above the main combustion chamber and the thermal energy recovery chamber; wherein the thermal energy recovery chamber is communicated at upper and lower portions thereof with the main fluidized bed combustion chamber, a moving bed is formed above the portion of the air diffusion device where the injected mass flow is smaller so that a fluidized medium descends and diffuses within the moving bed, and a circulating fluidized bed is formed above the portion of the air diffusion device where the mass flow of the fluidizing air is greater so that the fluidized medium is intensely fluidized and whirled towards a position above the moving bed and a part of the fluidized medium is introduced into the thermal energy recovery chamber beyond an upper portion of the inclined partition wall, the formation of the moving bed and the circulating fluidized bed is effected by regulation of the amount of air injected upwardly from the air diffusion device, and regulation of the fluidizing air injected from the air diffuser in the thermal energy recovery chamber causes the fluidized medium within the recovery chamber to descend in a state of a moving bed for circulation to the main combustion chamber, and combustion gas from the main combustion chamber and the thermal energy recovery chamber is mixed in the free board.

According to a preferred embodiment, the boiler comprises at least one secondary air supplying nozzle for supplying a secondary air into the free board so that combustion gas from the main combustion chamber and the thermal energy recovery chamber is mixed and unburned combustible materials in the combustion gas is combusted. Further, the boiler comprises screening means provided between the main combustion chamber and the thermal energy recovery chamber for preventing combustible materials having a large grain size from entering the thermal energy recovery chamber, and for allowing combustion gas from the thermal energy recovery chamber to pass therethrough while regulating stream of the combustion gas.

According to another aspect of the present invention, there is provided a pressurized internal circulating fluidized-bed boiler for use in a combined-cycle electric generating system, comprising: a pressure vessel; a combustor disposed in the pressure vessel and having a cylindrical outer wall; a main combustion chamber having an air diffusion device provided at the bottom of the combustor and adapted to inject fluidizing air upwardly under a mass flow that is at least greater at an outer side than that at a central side; a partition having a cylindrical partition and a conical partition formed at an upper portion of the cylindrical partition, the conical partition being provided above a portion of the air diffusion device where the mass flow is greater so as to interfere with the upward flow of the fluidizing air and thereby to deflect the air towards a portion above the central side of the air diffusion device where the mass flow is smaller; an annular thermal energy recovery chamber partitioned from the main combustion chamber by the partition; a heat transfer surface means provided in the thermal energy recovery chamber for a passage of a heat receiving fluid therethrough; and an air diffuser provided at a lower portion of the thermal energy recovery chamber; wherein the thermal energy recovery chamber is communicated at upper and lower portions thereof with the main fluidized bed combustion chamber, a moving bed is formed above the portion of the air diffusion device where the injected mass flow is smaller so that a fluidized medium descends and diffuses within the moving bed, and a circulating fluidized bed is formed above the portion of the air diffusion device where the mass flow of the fluidizing air is greater so that the fluidized medium is actively fluidized and whirled towards a position above the moving bed and a part of the fluidized medium is introduced into the thermal energy recovery chamber beyond an upper portion of the inclined partition wall, the formation of the moving bed and the circulating fluidized bed is effected by regulation of the amount of air injected upwardly from the air diffusion device and regulation of the fluidizing air injected from the air diffuser in the thermal energy recovery chamber causes the fluidized medium within the recovery chamber to descend in a state of a moving bed for circulation.

According to a preferred embodiment, the boiler comprises a free board provided integrally above the main combustion chamber and the thermal energy recovery chamber, wherein combustion gas from the main combustion chamber and the thermal energy recovery chamber is mixed in the free board. Further, the boiler comprises at least one secondary air supplying nozzle for supplying a secondary air into the free board so that combustion gas from the main combustion chamber and the thermal energy recovery chamber is mixed and unburned combustible materials in the combustion gas is combusted.

According to a preferred embodiment, the boiler comprises screening means provided between the main combustion chamber and the thermal energy recovery chamber for preventing combustible materials having a large grain size from entering the thermal energy recovery chamber, and for allowing combustion gas from the thermal energy recovery chamber to pass therethrough while regulating stream of the combustion gas. Further, the boiler comprises a second air diffuser provided at the connection opening for enabling fluidized medium to be actively fluidized in the connecting opening.

According to a preferred embodiment, the heat transfer surface means comprises heat transfer tubes which are installed in a radial pattern, the heat transfer tubes are divided into a plurality of blocks for use as a block of evaporating tubes, a block of steam superheating tubes and a block of steam reheating tubes. Further, the boiler comprises a dust collector provided in a passage of combustion gas, wherein flying ashes caught by the dust collector is returned to the thermal energy recovery chamber through an opening formed in the pressure vessel.

According to another aspect of the present invention, there is provided a topping-cycle compound electric generating system including a gasifier for generating a gas and char, an oxidizer for combusting the char to produce combustion gas, and a gas turbine which is driven by a high-temperature gas produced by combusting mixture of the generated gas and the combustion gas, at least one of the gasifier and the oxidizer comprising a pressurized internal circulating fluidized-bed boiler which comprises: a pressure vessel; a combustor disposed in the pressure vessel and having a cylindrical outer wall; a main combustion chamber having an air diffusion device provided at the bottom of the combustor and adapted to inject fluidizing air upwardly under a mass flow that is at least greater at an outer side than that at a central side; a partition having a cylindrical partition and a conical partition formed at an upper portion of the cylindrical partition, the conical partition being provided above a portion of the air diffusion device where the mass flow is greater so as to interfere with the upward flow of the fluidizing air and thereby to deflect the air towards a portion above the central portion of the air diffusion device where the mass flow is smaller; an annular thermal energy recovery chamber partitioned from the main combustion chamber by the partition; a heat transfer surface means provided in the thermal energy recovery chamber for a passage of a heat receiving fluid therethrough; and an air diffuser provided at a lower portion of the thermal energy recovery chamber; wherein the thermal energy recovery chamber is communicated at upper and lower portions thereof with the main fluidized bed combustion chamber, a moving bed is formed above the portion of the air diffusion device where the injected mass flow is smaller so that a fluidized medium descends and diffuses within the moving bed, and a circulating fluidized bed is formed above the portion of the air diffusion device where the mass flow of the fluidizing air is greater so that the fluidized medium is actively fluidized and whirled towards a position above the moving bed and a part of the fluidized medium is introduced into the thermal energy recovery chamber beyond an upper portion of the inclined partition wall, the formation of the moving bed and the circulating fluidized bed is effected by regulation of the amount of air injected upwardly from the air diffusion device and regulation of the fluidizing air injected from the air diffuser in the thermal energy recovery chamber causes the fluidized medium within the recovery chamber to descend in a state of a moving bed for circulation.

According to another aspect of the present invention, there is provided an integral type of influidized-bed boiler for use in a topping-cycle compound electric generating system, comprising: a cylindrical outer wall; a cylindrical partition provided concentrically with the cylindrical outer wall; a gasifier formed inside the cylindrical partition; an oxidizer formed between the cylindrical outer wall and the cylindrical partition; an air diffusion device provided at the bottom of the gasifier and adapted to inject fluidizing air upwardly under a mass flow that is at least greater at an outer side than that at a central side; a conical partition formed on the cylindrical partition, the conical partition being provided above a portion of the air diffusion device where the mass flow is greater so as to interfere with the upward flow of the fluidizing air and thereby to deflect the air towards a portion above the central portion of the air diffusion device where the mass flow is smaller; an air diffuser provided at a lower portion of the oxidizer; and a first free board defined above the gasifier and a second free board defined above the oxidizer, the first and second free boards are separated from each other by the cylindrical partition so that a gas produced by the gasifier and combustion gas from the oxidizer are separately discharged towards the outside; wherein the oxidizer is communicated at intermediate and lower portions thereof with the gasifier, a moving bed is formed above the portion of the air diffusion device where the injected mass flow is smaller so that a fluidized medium descends and diffuses within the moving bed, and a circulating fluidized bed is formed above the portion of the air diffusion device where the mass flow of the fluidizing air is greater so that the fluidized medium is actively fluidized and whirled towards a position above the moving bed and a part of the fluidized medium is introduced into the oxidizer beyond an intermediate portion of the partition wall, the formation of the moving bed and the circulating fluidized bed is effected by regulation of the amount of air injected upwardly from the air diffusion device and regulation of the fluidizing air injected from the air diffuser in the oxidizer causes the fluidized medium within the oxidizer to descend in a state of a moving bed for circulation.

With the above arrangements, the present invention offers the following operations or advantages:

(1) Since the main combustion chamber and the thermal energy recovery chamber are functionally separated from each other within the combustor, the boiler can be controlled to meet a load simply by varying the overall heat transfer coefficient of the heat transfer tubes through adjustment of the amount of air introduced into the thermal energy recovery chamber, rather than by varying the height of the fluidized bed in the combustion chamber. Therefore, no complex process and equipment is necessary to take the fluidized medium into and out of the combustion chamber and the thermal energy recovery chamber, and no agglomeration is generated as the fluidized medium flows into and out of the main combustion chamber and the thermal energy recovery chamber. Since the temperature of the fluidized bed is kept at a constant level even when the load on the boiler varies, the boiler can be operated under a temperature condition optimum for the suppression of NOx, SOx, and other undesirable emissions. Inasmuch as the heat transfer tubes are positioned only in the thermal energy recovery chamber which is exposed to a gradual flow of the fluidized medium, the heat transfer tubes are less subject to erode than would be if they were placed in the fluidized bed which is in an intense flow condition.

As swirling flows are developed in the fluidized bed, the fluidized medium does not stay stagnant in the fluidized bed, and the fuel such as coal or petro coke is uniformly dispersed and combusted, with no agglomeration produced. Thus, efficiency of gas turbine is not lowered. The amount of carbon monoxide and nitrogen oxide (NOx) produced is kept low because the exhaust gas emitted from the fluidized bed is not cooled by the heat transfer tubes.

Further, a free board having a wide space is defined above he thermal energy recovery chamber and the main combustion chamber, combustion gas from the thermal recovery chamber and the main combustion chamber is sufficiently mixed in the free board. Therefore, combustion gas remains in the free board for a long period of time, combustible materials are sufficiently combusted in the free board. Furthermore, since secondary air is supplied to the free board, combustion gas from the thermal recovery chamber and the main combustion chamber is fully mixed and unburned combustible materials entrained in combustion gas are sufficiently combusted in the free board.

(2) A cylindrical combustor is accommodated in a pressure vessel which can retain higher inner pressure than atmospheric pressure. The pressure vessel may be of a cylindrical shape or a spherical shape. Inside the fluidized bed of the cylindrical combustor, there is provided a cylindrical partition, with a tapered upper section constituting a conical partition, which separates the main combustion chamber from the thermal energy recovery chamber. The conical partition serves to interfere with the upward flow of the fluidizing air and to thereby deflect the air towards the central part of the main combustion chamber. In the thermal energy recovery chamber, immersed heat transfer tubes are installed in a radial pattern in the plan view. A bottom face of the main combustion chamber is conical in shape and is provided with air diffusion nozzles which fluidize the bed material in the main combustion chamber. The volume of air to be injected from these air diffusion nozzles is controlled in such a manner that the fluidizing gas velocity within the range of a concentric circle which has about half the diameter of the main combustion chamber slows to a velocity of approximately 1 to 2.5 times the minimum fluidizing gas velocity (Umf). The fluidizing gas velocity in the annular area surrounding the concentric circle achieves a high velocity of approximately 4 to 12 times the minimum fluidizing gas velocity (Umf).

Because of this arrangements, the bed material (fluidized medium) in the fluidized bed of the main combustion chamber starts to descend in the central part of the main combustion chamber and then slowly disperses in all directions along the conically shaped bottom face to reach the surrounding annular area, where due to the existing intense fluidization, the fluidized medium is forced to blow upward and moves along the inner face of the cylindrical partition. At this time, since the conical partition is formed at the upper section of the cylindrical partition, the blowing force is concentrated to finally achieve its maximum level when reaching the surface of the fluidized bed where the fluidized medium forcibly reverses its course by reactive force to thus disperse horizontally in all directions as well as partly upward direction.

As a result of this action, a large quantity of fluidized medium (bed material) flows into the thermal energy recovery chamber beyond the top of the partition, while the residual medium remaining on the surface of the fluidized bed settles as a cylindrical flow in the vicinity of the central part while entraining the surrounding fluidized medium. When the fluidized medium reaches the area near the central part of the conical bottom face of the main combustion chamber, it develops a circulating flow moving in a horizontal direction toward a circumferential area. The circulating flow causes the fluidized medium to flow as a dispersed flow from the central part along the conical bottom face gradually in all directions, thereby uniformly dispersing fuel and desulfurizing agent. Therefore, the combustion becomes uniform without developing an agglomeration. The number of fuel feeding ports may be minimized, resulting in a highly simplified fuel supply system. Since the fluidized medium remaining on the surface of the fluidized bed settles as a cylindrical flow in the vicinity of the central part while entraining the surrounding fluidized medium, the fuel and the desulfurizing agent remain in the fluidized bed for a long period of time for increased combustion efficiency and desulfurization efficiency.

A large amount of fluidized medium flows over the partition and enters the thermal energy recovery chamber. A comb-toothed screen is disposed in the free board above an upper portion of the main combustion chamber and the thermal energy recovery chamber in surrounding relation to the thermal energy recovery chamber. The comb-toothed screen is effective to prevent a solid fuel such as coal particles of large diameter from entering the thermal energy recovery chamber. Accordingly, the development of an agglomeration can be avoided in the fluidized bed in the thermal energy recovery chamber though the fluidized bed is slowly flowing at a speed that is less than twice the minimum fluidizing gas velocity. The screen serves as a baffle against combustion gas generated in the thermal energy recovery chamber, thus permitting the combustion gas to be mixed and agitated sufficiently with combustion gas generated in the main combustion chamber. In the pressurized fluidized-bed boiler, when the combustion gas entrains a large amount of unburned materials, the combustion efficiency is lowered, the unburned materials are combusted in a downstream dust collector such as a cyclone, developing a agglomeration, and, if the dust collector comprises ceramic filters, the unburned materials are combusted on the surface of the ceramic filters, damaging the ceramic filters. These troubles are responsible for the failure of the pressurized fluidized-bed boiler to operate. Therefore, it is desirable to completely combust combustible materials in the combustor. The mixing and agitating action achieved by the screen as it functions as a baffle is highly effective, in combination with the manner in which secondary air is charged, the height of the free board, and the period of time for which the combustion gas remains in the free board, to completely combust combustible materials in the free board.

(3) Since no heat transfer surface is disposed in the main combustion chamber of the internal circulating fluidized-bed boiler according to the present invention, it is possible to combust the fuel in a reducing atmosphere in the main combustion chamber. Therefore, by setting a distribution ratio for combustion air, the main combustion chamber is supplied with air at a rate equal to or lower than a stoichiometric air flow rate required for combustion, and the thermal energy recovery chamber is charged with air at a flow rate required for thermal energy recovery control, and the remaining air required for complete combustion is supplied as secondary air through a plurality of secondary air nozzles mounted in the free board to perform two-stage combustion. As a result, the fuel is combusted in a reducing atmosphere in the main combustion chamber to actively discharge volatile matter of coal. Hydrocarbons such as $CH_4$, CO or gaseous N chemical species including NHi, HCN, etc. reduce nitrogen oxides generated by combustion in gas phase reaction, and selectivity or probability for N chemical species to convert into nitrogen oxides is lowered. Therefore, it is possible to effect a lowNOx combustion in the main combustion chamber.

(4) The air chamber and the air diffuser which are disposed in the furnace bed beneath the connecting opening below the partition are effective to fluidize the fluidized medium in the entire connecting opening for thereby increasing the amount of fluidized medium that is circulated through the thermal energy recovery chamber into the main combustion chamber. The air chamber may communicate with an air chamber for thermal energy recovery control, or may be controlled independently of such an air chamber. If the air chamber is controlled independently of the air chamber for thermal energy recovery control, then it is possible to control the circulated amount of fluidized medium independently of the amount of diffused air in the thermal energy recovery chamber. In this case, the air chamber functions as a regular valve. As a result, it is possible for the cylindrical combustor to circulate a greater amount of fluidized medium than that of a rectangular combustor, and the thermal energy recovery chamber of the cylindrical combustor can be larger in size than that of the rectangular combustor, allowing the cylindrical combustor to manifest its advantages.

(5) The immersed heat transfer tubes in the fluidized bed in the thermal energy recovery chamber are arranged radially and divided by function into a block of evaporation tubes, a block of steam superheating tubes, and a block of steam reheating tubes. The amount of diffused air from the furnace bed in the thermal energy recovery chamber can thus be adjusted in each of the blocks so that the amount of recovered thermal energy can be controlled independently in each block. Maintenance spaces are provided between the blocks for inspecting the immersed heat transfer tubes. Since the maintenance spaces may not necessarily be required, the boiler may be made more compact if the maintenance spaces are dispensed with.

(6) Where flying ashes collected by a particle separator disposed in the downstream end of exhaust gas flow path are returned to the thermal energy recovery chamber, the average diameter and specific gravity of particles in the thermal energy recovery chamber are reduced. While the average diameter of particles in the main combustion chamber is about 0.6 mm, the diameter of particles accompanying the combustion gas and collected by the particle separator for recycling is much smaller, and their specific gravity is also small as they contain char. In the thermal energy recovery chamber, the fluidizing gas velocity is small, about twice the minimum fluidizing gas velocity. Therefore, the recycled particles are prevented from being entrained again, so that the average diameter and specific gravity of particles in the thermal energy recovery chamber are smaller than those in the main combustion chamber.

The minimum fluidizing gas velocity (Umf) is proportional to the square of the particle diameter of the fluidized medium and also to the specific gravity thereof, so that the fluidizing gas velocity in the thermal energy recovery chamber is considerably smaller than that in the main combustion chamber. Consequently, the air flow rate for thermal energy recovery control may be considerably lower than if the flying ashes were not recycled into the thermal energy recovery chamber. As a result, the fluidizing gas velocity (U0) in the thermal energy recovery chamber is lowered. Inasmuch as the erosion rate of the immersed heat transfer tubes disposed in the thermal energy recovery chamber is proportional to the cube of the fluidizing gas velocity (U0), the erosion rate of the immersed heat transfer tubes is greatly reduced when the fluidizing gas velocity (U0) is lowered. The reduction in the thermal-energy-recovery air flow rate can minimize effects on the combustion when any change of the air flow rate occurs, and is highly effective to achieve a stable combustion.

(7) A dust collector is disposed in the passage of the exhaust gas delivered from the cylindrical internal circulating fluidized-bed boiler, and a classifying device is provided for collecting an unreacted desulfurizing agent and unburned carbon from collected flying ashes and classifying the flying ashes into three groups of larger, medium, and smaller particle diameters, with only those flying ashes of medium particle diameter also returned to the main combustion chamber and/or the free board and/or the fuel supply system. Since only particles having a diameter ranging from 10 to 60 $\mu$m with a highest char concentration are returned to the cylindrical combustor, it is possible to lower NOx, reduce erosion of the exhaust gas flow path, and increase the combustion efficiency with a minimum amount of circulating ashes.

(8) In the topping-cycle combined electric generating system, a cylindrical internal circulating fluidized-bed boiler is used as a gasifier and/or an oxidizer. Unburned char discharged from the gasifier is entrained, in its entirety, by the generated gas and cooled to 600° C. or below, and then collected by a downstream dust collector. Thereafter, the particles containing unburned char are introduced into the oxidizer where they are completely combusted. An exhaust gas produced in the oxidizer is discharged therefrom, and cooled to 600° C. or below. Particles containing Na, K, etc. entrained in the exhaust gas are collected by and discharged from a downstream dust collector. The purified exhaust gas and the generated gas which has been discharged from the gasifier and filtered to remove particles containing Na, K, etc. therefrom are mixed and burned in a topping-cycle combustor. A high-temperature exhaust gas produced by the topping-cycle combustor is introduced into a gas turbine. Inasmuch as the exhaust gas does not entrain particles containing alkaline metal such as Na, K, etc., which would otherwise be responsible to high-temperature corrosion of the turbine blades, the gas turbine may be made of conventional materials and designed in a conventional manner.

The above and other objects, features, and advantages of the present invention will become apparent from the following description when taken in conjunction with the accompanying drawings which illustrate preferred embodiments of the present invention by way of examples.

DETAILED DESCRIPTION OF THE PREFERRED EMBODIMENT

A pressurized internal circulating fluidized-bed boiler according to the present invention will be described below with reference to FIGS. 1 through 13.

(First embodiment)

Figure 1:
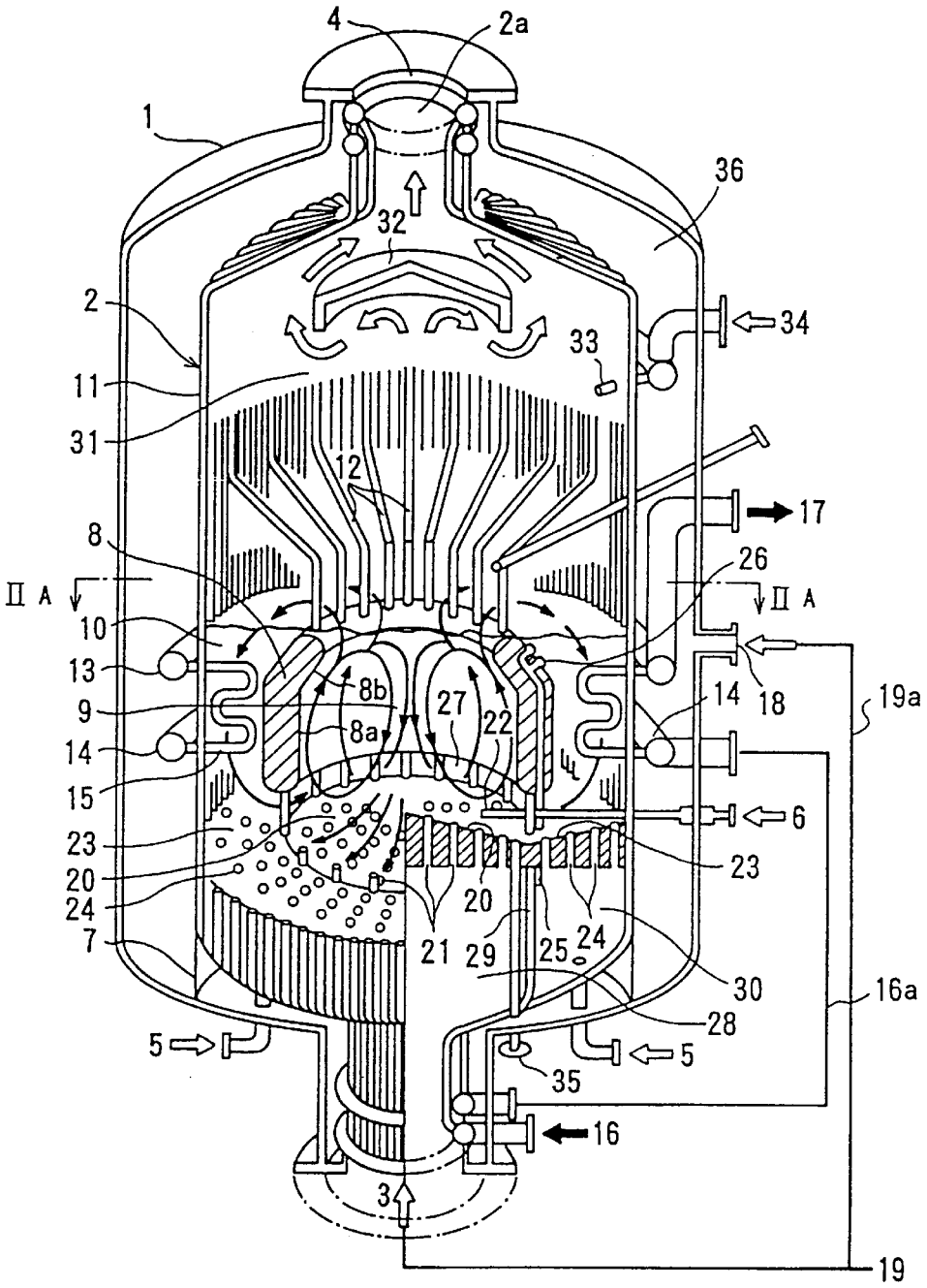
FIG. 1 is a cross-sectional view of a pressurized internal circulating fluidized-bed boiler according to a first embodiment of the present invention.

As shown in FIG. 1, the combined-cycle electric generating system includes a pressure vessel 1 which is of a cylindrical receptacle-like structure. The pressure vessel 1 is provided with a combustion gas outlet 4 at the top, a fluidizing air inlet 3 and thermal energy recovery chamber control air inlets 5 at the bottom. The pressure vessel 1 is constructed in such a way that it can retain higher inner pressure than atmospheric pressure. The pressure vessel 1 may be of a spherical body.

Inside the pressure vessel 1, there is provided a cylindrical combustor 2 which is an air tight vessel having a cylindrical membrane wall 11 consisting of water tubes. A main fluidized bed combustion chamber 9 is formed inside the cylindrical combustor 2. On the top of the cylindrical combustor 2, there is provided a combustion gas outlet 2a which is connected to the combustion gas outlet 4 of the pressure vessel 1. The cylindrical combustor 2 is firmly held to the bottom by a cylindrical support 7 installed on the end plate of the pressure vessel 1. Inside the fluidized-bed of the cylindrical combustor 2, there is provided a partition 8 which separates a thermal energy recovery chamber 10 from the main combustion chamber 9. The partition 8 is composed of water tubes extending radially inwardly from the cylindrical membrane wall 11 and refractories lined on the membrane wall. The partition 8 comprise a cylindrical partition 8a and a conical partition 8b, having a radially inwardly inclined inner surface, formed at the upper portion of the cylindrical partition 8a. The conical partition 8b serves as a reflective wall for reflecting the fluidizing air injected from air nozzles towards the center of the main combustion chamber 9 so that swirling flows of the fluidized medium are developed in the main combustion chamber 9 as indicated by the arrows in FIG. 1. A free board 31 is defined above the main combustion chamber 9 and the thermal recovery chamber 10. There is no wall such as a partition wall between a free board above the thermal energy recovery chamber 10 and a free board above the main combustion chamber 9 to thus define a vast integral free board, thereby allowing combustion gas from both chambers to intercommunicate freely.

Figure 2B:
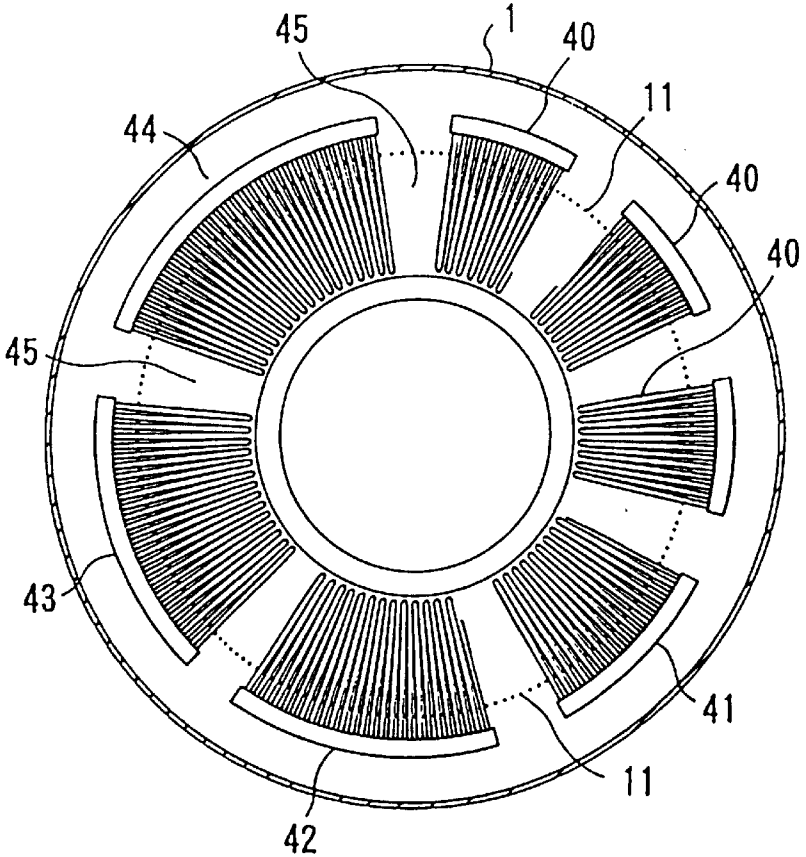
FIG. 2B is a cross-sectional view corresponding to FIG. 2A, showing a modified arrangement of heat transfer tubes.
Figure 2A:
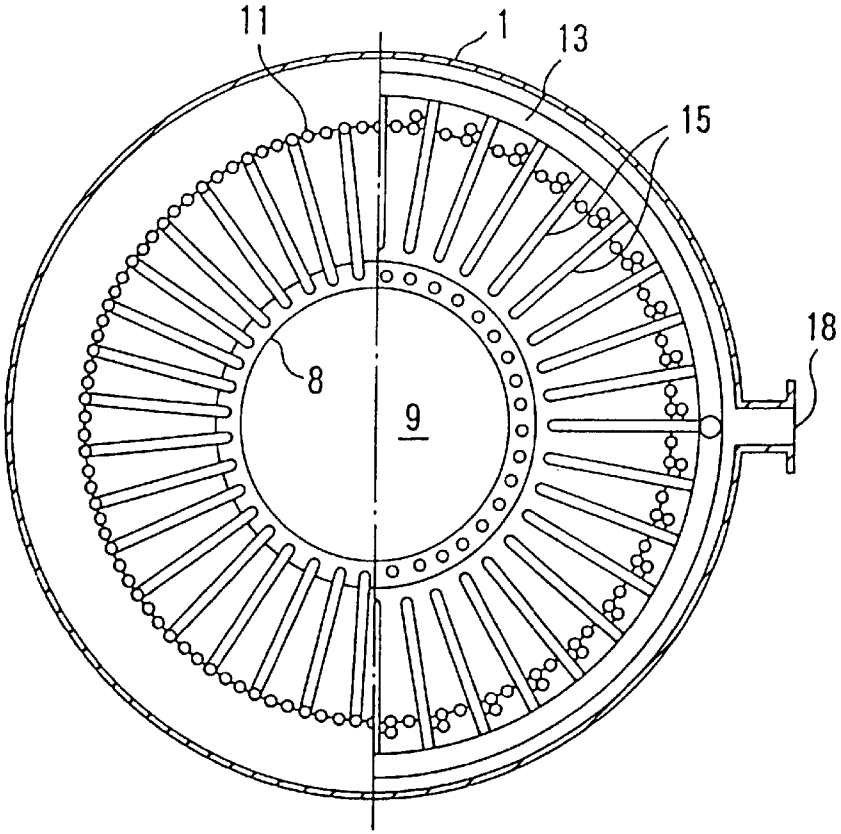
FIG. 2A is a cross-sectional view taken along lines IIA—IIA of FIG. 1.

In the thermal energy recovery chamber 10, immersed heat transfer tubes 15 are installed in a radial pattern in the plan view as shown in FIG. 2A. These tubes 15 are branched from upper and lower headers 13, 14 located on the cylindrical membrane wall 11 of the cylindrical combustor 2. A feed water inlet 16 is provided at the lower portion of the pressure vessel 1. Boiler water introduced from the feed water inlet 16 flows through the cylindrical membrane wall 11 and a connecting pipe 16a and is introduced into the lower header 14, and then distributed to the heat transfer tubes 15. Thermal energy generated in the main combustion chamber 9 is recovered by the heat transfer tubes 15 in the thermal recovery chamber 10 to thus generate steam. Steam generated in the heat transferred tubes 15 is collected in the upper header 13 and discharged from a steam outlet 17 to the outside.

An equalizing nozzle 18 is provided on the pressure vessel 1. The equalizing nozzle 18 is connected to a fluidizing air supply system 19 through an equalizing air supply pipe 19a. The fluidizing air supply system 19 is connected to the fluidizing air inlet 3. The fluidizing air supply system 19 provides the same pressure both to the pressure vessel 1 and the cylindrical combustor 2, thereby balancing the inner and the outer pressure of the cylindrical combustor 2 except for a small pressure difference due to pressure loss of the fluidized bed. With this construction, the cylindrical combustor 2 does not require a pressure-tight construction. In this case, in the free board 31 of the cylindrical combustor 2, the combustor 2 is subject to an exterior pressure. When balancing pressure of a space 36 between the pressure vessel 1 and the cylindrical combustor 2 and pressure of the free board 31 by providing a pressure reducing valve at the upstream of the equalizing nozzle 18, the lower portion of the fluidized bed is subject to the internal pressure due to pressure loss of the fluidized bed. A fuel supplying inlet 6 is provided on the pressure vessel 1. The fuel supplying inlet 6 is connected to a fuel feeding port 22. A bottom face 20 of the main combustion chamber 9 is conical in shape and is provided with air diffusion nozzles 21 which fluidize the fluidized medium in the main combustion chamber 9. The fuel feeding port 22 has an opening end in the vicinity of the bottom face 20 of the main combustion chamber 9. The volume of air to be blown out from the air diffusion nozzles 21 is controlled in such a manner that the fluidizing gas velocity within the range of a concentric circle which has about half the diameter of the main combustion chamber 9 slows to a velocity of approximately 1 to 2.5 times the minimum fluidizing gas velocity (Umf). The fluidizing gas velocity in the annular area surrounding the concentric circle achieves a high velocity of approximately 4 to 12 times the minimum fluidizing gas velocity (Umf).

Because of the above arrangement, the fluidized medium to the fluidized bed of the main combustor chamber 9 starts to descend in the central part of the main combustion chamber 9 and then slowly disperses in all directions along the conically shaped bottom face to reach the surrounding annular area, where due to the existing intense fluidization, the fluidized medium are forced to blow upward and moves along the inner face of the partition 8. At this time, since the conical partition 8b is formed at the upper section of the cylindrical partition 8a, the blowing force is concentrated to finally achieve its maximum level when reaching the surface of the fluidized bed where the fluidized medium forcibly reverses its course by reactive force to thus disperse horizontally in all direction as well as partly upward direction.

As a result of this action, a large quantity of fluidized medium flows into the thermal energy recovery chamber 10 beyond the partition 8. The fluidized bed in the thermal energy recover chamber 10 has a velocity of not more than 2 times the minimum fluidizing gas velocity (Umf). Since the fluidized bed is in a slow fluidizing state, agglomeration tends to be generated. Therefore, a solid fuel such as coal particles of large diameter is required not to enter the thermal energy recovery chamber 10. A comb-toothed screen 12 is disposed in the free board 31 above an upper portion of the main combustion chamber 9 and the thermal energy recovery chamber 10 in surrounding relation to the thermal energy recovery chamber 10. The comb-toothed screen 12 is effective to prevent a solid fuel of large diameter from entering the thermal energy recovery chamber 10. Accordingly, the development of an agglomeration can be avoided in the fluidized bed in the thermal energy recovery chamber 10 though the fluidized bed is slowly flowing at a speed that is less than twice the minimum fluidizing velocity. The screen 12 serves as a baffle against combustion gas generated in the thermal energy recovery chamber 10, thus permitting the combustion gas to be mixed and agitated sufficiently with combustion gas generated in the main combustion chamber 9. In the pressurized fluidized-bed boiler, when the combustion gas entrains a large amount of unburned materials, the combustion efficiency is lowered, the unburned materials are combusted in a downstream dust collector such as a cyclone, developing an agglomeration, and, if the dust collector comprises ceramic filters, the unburned materials are combusted on the surface of the ceramic filters, damaging the ceramic filters. These troubles are responsible for the failure of the pressurized fluidized-bed boiler to operate. Therefore, it is desirable to completely combust combustible materials in the combustor. The mixing and agitating action achieved by the screen 12 as it functions as a baffle is highly effective, in combination with the manner in which secondary air is charged, the height of the free board 31, and the period of time for which the combustion gas remains in the free board 31, to completely combust combustible materials in the free board 31.

On the other hand, the fluidized medium of the main combustion chamber 9 starts to descend in the central part in a state of cylindrical flow. As soon as the descending medium reaches the central part of the conical bottom face 20 of the main combustion chamber 9, the medium start to disperse in all directions again. In this way, the internal circulation is produced as shown in FIG. 1. By this internal circulation, a fuel such as coal water paste supplied from the fuel feeding port 22 disperses in all directions uniformly in the main combustion chamber 9. Therefore, even if the fuel supplying system has a simple structure, an uneven distribution of fuel is avoidable to thus prevent agglomeration.

A bottom face 23 of the thermal energy recovery chamber 10 is conical in shape and is provided with air diffusion nozzles 24 which fluidize the fluidized medium in the thermal energy recovery chamber 10. By injecting air from the air diffusion nozzles 24 which are connected to the thermal energy recovery chamber control air inlets 5, the fluidized medium entering the thermal energy recovery chamber 10 beyond the partition 8 starts to descend slowly through the fluidized bed of the thermal energy recovery chamber 10 where it undergoes the heat exchange process through the heat transfer tubes 15. The medium then passes through a connection opening 27 provided below the cylindrical partition 8a to return to the main combustion chamber 9. In this way, thermal energy produced in the main combustion chamber 9 is efficiently recovered through the heat transfer tubes 15 provided in the thermal energy recovery chamber 10.

In addition, supplemental air diffusion nozzles 26 and an air supplying pipe 25 connected to the nozzles 26 may be installed on the outer surface of the conical partition 8b. The supplemental air diffusion nozzles 26 injects air to fluidize the medium and combust combustible materials partly that has entered the thermal energy recovery chamber 10. However, in case of the conical partition 8b with a large inclined angle, such supplemental air diffusion nozzles 26 are not necessarily provided.

A fluidizing air chamber 28 is defined below the bottom face 20 of the main combustion chamber 9. The fluidizing air chamber 28 is enclosed by the membrane wall 29 which supports the partition 8 and connected to the fluidizing air inlet 3. Thermal energy recovery control air chamber 30 is defined below the bottom face 23 of the thermal energy recovery chamber 10. The thermal energy recovery control air chamber 30 is connected to an air supplying system through the thermal energy recovery control air inlets 5.

The free board 31 having a wide space is defined above the main combustion chamber 9 and the thermal energy recovery chamber 10. That is, there is no throat between the main combustion chamber 9 and the thermal energy recovery chamber 10, and the free board 31. Therefore, combustion gas from the main combustion chamber 9 and the thermal energy recovery chamber 10 is sufficiently mixed with each other in the free board 31 and remain in the free board 31 for a long period of time, thus combustible materials entrained in the gas can be sufficiently combusted in the free board 31.

Further, a plurality of secondary air nozzles 33 connected to a secondary air inlet 34 are provided in the free board 31 to enable two-stage combination. Since no heat transfer surface is disposed in the main combustion chamber 9, it is possible to combust the fuel in a reducing atmosphere in the main combustion chamber 9. Therefore, by setting a distribution ratio for combustion air, the main combustion chamber 9 is supplied with air at a rate equal to or lower than a stoichiometric air flow rate required for combustion, and the thermal energy recovery chamber 10 is charged with air at a flow rate required for thermal energy recovery control, and the remaining air required for complete combustion is supplied as secondary air through a plurality of secondary air nozzles 33 mounted in the free board 31 to perform two-stage combustion. As a result, the fuel is combusted in a reducing atmosphere in the main combustion chamber 9 to actively discharge volatile matter of coal. Hydrocarbons such as $CH_4$, CO or gaseous N chemical species including NHi, HCN, etc. reduce nitrogen oxides generated by combustion in gas phase reaction, and selectivity or probability for N chemical species to convert into nitrogen oxides is lowered. Therefore, it is possible to effect a low-NOx combustion in the main combustion chamber 9.

A baffle 32 is provided in the free board 31 to prevent combustion gas from causing short-pass toward the combustion gas outlet 4 and to enable combustion gas to be mixed sufficiently in the free board 31. However, in the case where combustion gas is sufficiently mixed by the secondary air, or superficial gas velocity is low and the free board has a sufficient height, the baffle 32 is not necessarily provided, because there is a low possibility of the short-pass.

FIG. 2B shows a modified arrangement of heat transfer tubes shown in FIG. 2A. The immersed heat transfer tubes in the fluidized bed in the thermal energy recovery chamber are arranged radially and divided by function into a block 40 of evaporation tubes, a No.1 block 41 of steam superheating tubes, a No.2 block 42 of steam superheating tubes, a No.3 block 43 of steam superheating tubes, and a block 44 of steam reheating tubes. In case of an once-through boiler, steam flows through the block 40 of evaporation tubes, the No.1 block 41 of steam superheating tubes, the No.2 block 42 of steam superheating tubes, and the No.3 block 43 of steam superheating tubes in sequence. The generated superheated steam is introduced into a high-pressure steam turbine, and then returned to the block 44 of steam reheating tubes again. The steam heated by the block 44 of steam reheating tubes is introduced into an intermediate-pressure steam turbine.

With this arrangement of the heat transfer tubes, the amount of air from the air distribution nozzles 24 in the thermal energy recovery chamber 10 can thus be adjusted in each of the blocks so that the amount of recovered thermal energy can be controlled independently in each block. Maintenance spaces 45 are provided between the blocks for inspecting the immersed heat transfer tubes. The boiler may be made more compact if the maintenance spaces are dispensed with.

Figure 3:
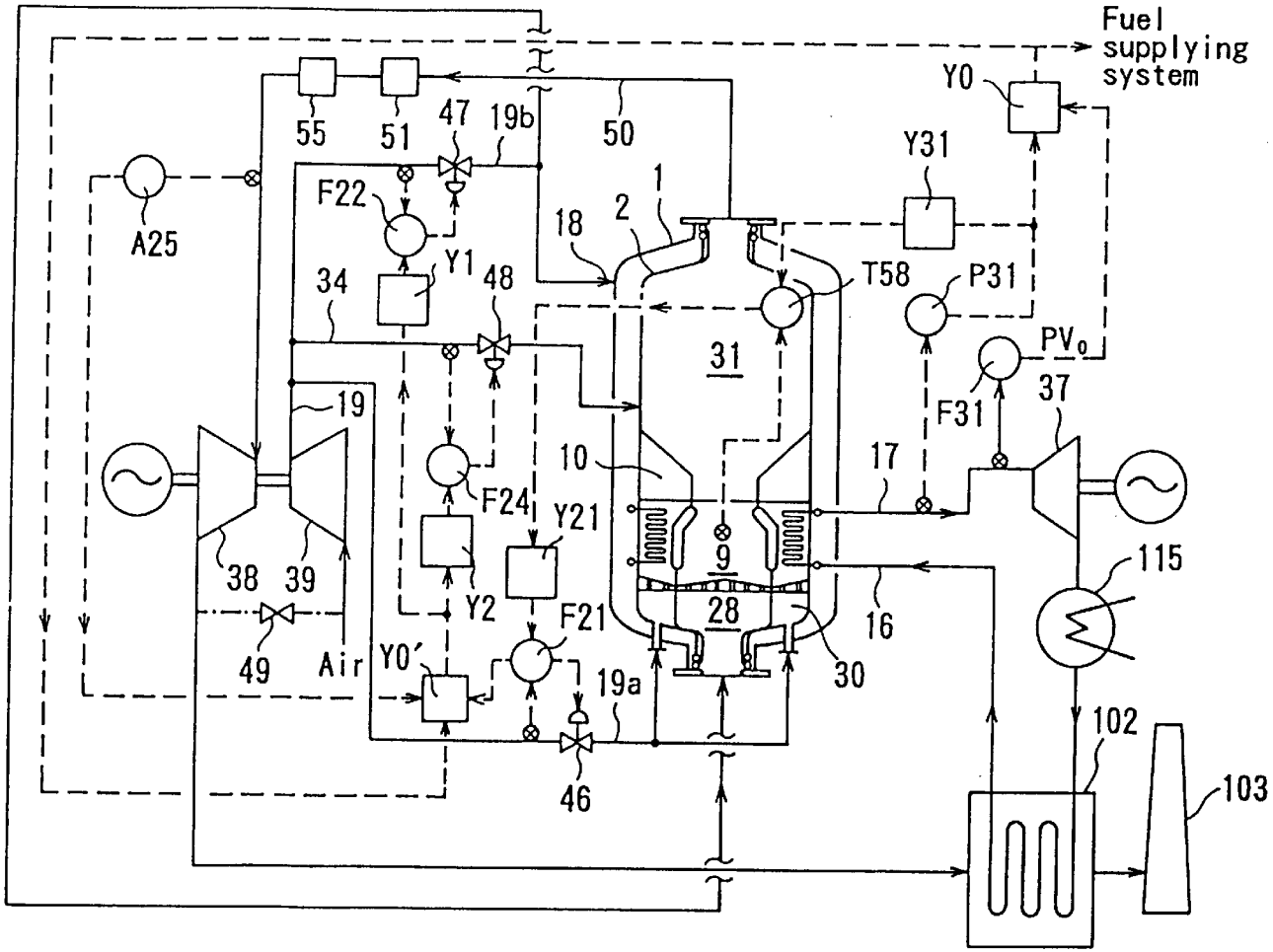
FIG. 3 is a system diagram of a combined-cycle electric generating system which incorporates a pressurized internal circulating fluidized-bed boiler according to a first embodiment of the present invention.

FIG. 3 is illustrative of an arrangement for controlling an air supplying system depending on a change in the load. When the load changes, the steam flow rate in a steam outlet 17, i.e., a steam line connected to a turbine inlet, varies, thus varying a steam flow rate signal generated by a steam flow meter F31. A computing unit Y0 calculates an output signal based on the steam flow rate signal from the steam flow meter F31 and a pressure signal from a steam pressure controller P31, and sends the calculated output signal to a fuel supplying system for supplying a fuel at a rate corresponding to the load. The output signal from the computing unit Y0 is also sent to a computing unit Y0 ' of the air supplying system.

The computing unit Y0' receives, in addition to the output signal from the computing unit Y0, output signal from an oxygen content controller A25 and a thermal-recovery-control air flow controller F21 of an exhaust gas flow path 50. Based on the received signals, the computing unit Y0 ' calculates an output signal indicative of a remaining air flow rate, which is equal to the difference between a total air flow rate for complete combustion and a thermal-energy-recovery air flow rate, for thereby regulating the combustion air flow rate to make constant the oxygen content in the flue gas. Based on the output signal from the computing unit Y0 ', computing units Y1, Y2 effect predetermined calculations to produce respective output signals that are sent to a fluidizing air flow controller F22 and a secondary air flow controller F24 for supplying fluidizing air and secondary air at a constant ratio to the combustor 2.

With the fluidizing air and secondary air being supplied at a constant ratio, it is possible to effect a two-stage combustion mode in which the main combustion chamber 9 is supplied with air at a rate equal to or lower than a stoichiometric air flow rate required for combustion, and the thermal energy recovery chamber 10 is charged with air at a flow rate required for thermal energy recovery control, and the remaining air required for complete combustion is supplied as secondary air to the free board 31.

Since the combustion is effected in a reducing atmosphere in the main combustion chamber 9, volatile matter of the coal are actively discharged by the reducing combustion, and hydrocarbons such as $CH_4$, CO or gaseous N chemical species including NHi, HCN, etc. reduce generated nitrogen oxides in gas phase reaction, and selectively or probability for N chemical species to convert them into nitrogen oxides is lowered. Therefore, it is possible to effect a low-NOx combustion in the main combustion chamber 9.

The output signal from the steam pressure controller P31 serves to control a fluidized bed temperature controller T58 through a computing unit Y31. More specifically, when the steam pressure is lowered slightly, an output signal from the computing unit Y31 slightly reduces the bed temperature setting value of the fluidized bed temperature controller T58. A control signal from the fluidized bed temperature controller T58 is varied and applied through a computing unit Y21 to the thermal-recovery-control air flow controller F21, which then increases the thermal-energy-recovery air flow rate.

Figure 4:
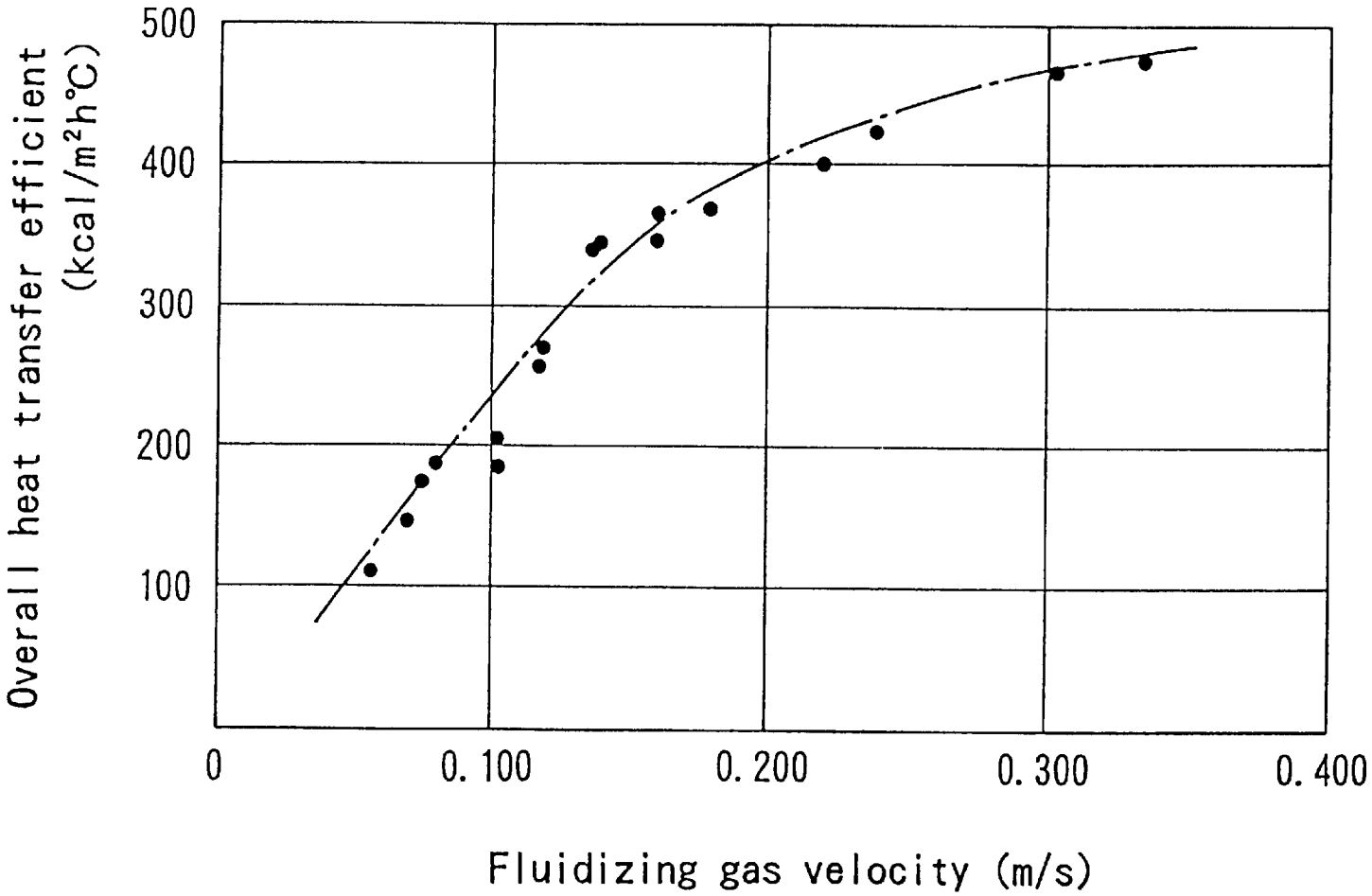
FIG. 4 is a graph showing the relationship between overall heat transfer coefficient of immersed heating surface and fluidizing gas velocity.

As shown in FIG. 4, the overall heat transfer coefficient of the immersed heat transfer tubes in the thermal energy recovery chamber 10 is substantially proportional to the fluidizing gas velocity in the fluidized bed in the thermal energy recovery chamber 10. Therefore, as the thermal-energy-recovery air flow rate, i.e., the fluidizing gas velocity, increases, the amount of collected heat increases to thus recover the steam pressure. When the steam pressure increases beyond a preset value, the system operates in an opposite manner to reduce the thermal-energy-recovery air flow rate for thereby lowering the steam pressure.

In this manner, the fuel feeding rate is regulated in a main control mode, and the rate of thermal-energy-recovery air flow is regulated in an auxiliary control mode, so that any adverse effects caused by load changes are minimized for quick and stable combustion control.

The gas outlet of the gas turbine 28 and the air inlet of the compressor 39 may be connected to each other through a valve 49 which is operable to regulate the rate of an exhaust gas mixed into air to be supplied to the compressor 39 for reducing NOx and stabilizing fluidization due to an increase in the fluidizing gas velocity at low loads.

Figure 5:
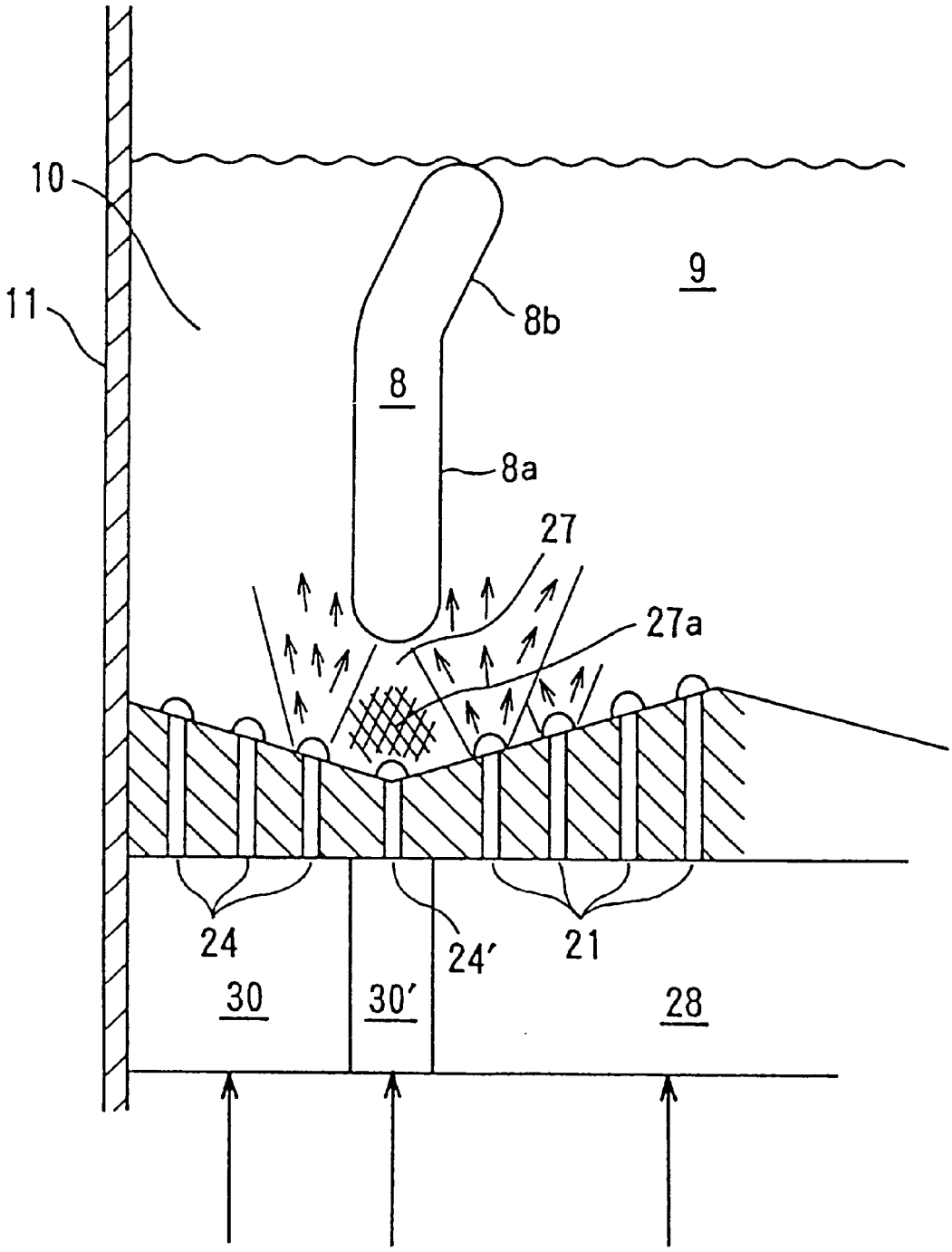
FIG. 5 is a cross-sectional view showing a detailed structure of the cylindrical combustion of FIG. 1.

FIG. 5 shows a detailed structure of the cylindrical combustor 2 shown in FIG. 1. Where the combustor 2 is of a cylindrical shape as shown in FIG. 1, the thermal energy recovery chamber 10 extends as an annular chamber outside of the partition 8 and thus can have a larger size than a rectangular combustor, so that it can accommodate more heat transfer tubes therein. To allow the thermal energy recovery chamber 10 to manifest its advantages, it is necessary to circulate a greater amount of fluidized medium than the rectangular combustor.

Heretofore, since there is no air diffusion nozzles in the connecting opening 27 below the partition 8, the bed is fluidized in an auxiliary manner by fluidizing air from the air diffusion nozzles 24 in the thermal energy recovery chamber 10 and the air diffusion nozzles 21 in the main combustion chamber 9. Therefore, there has been heretofore been a region 27a where the fluidization is not active. According to the present invention, such a problem can be solved by an air chamber 30' and an air diffuser nozzles 24' which are disposed in the furnace bed beneath the connecting opening 27 below the partition 8. The air chamber 30' and the air diffusion nozzles 24' are effective to fluidize the bed in the entire connecting opening 27 for thereby increasing the amount of fluidized medium that is circulated through the thermal energy recovery chamber 10 into the main combustion chamber 9.

The air chamber 30 may communicate with an air chamber 30 for thermal energy recovery control, or may be controlled independently of the air chamber 30. If the air chamber 30' is controlled independently of the air chamber 30, then it is possible to control the circulated amount of fluidized medium independently of the amount of diffused air in the thermal energy recovery chamber 10. In this case, the air chamber 30' functions as a regulator valve.

(Second embodiment)

Figure 6:
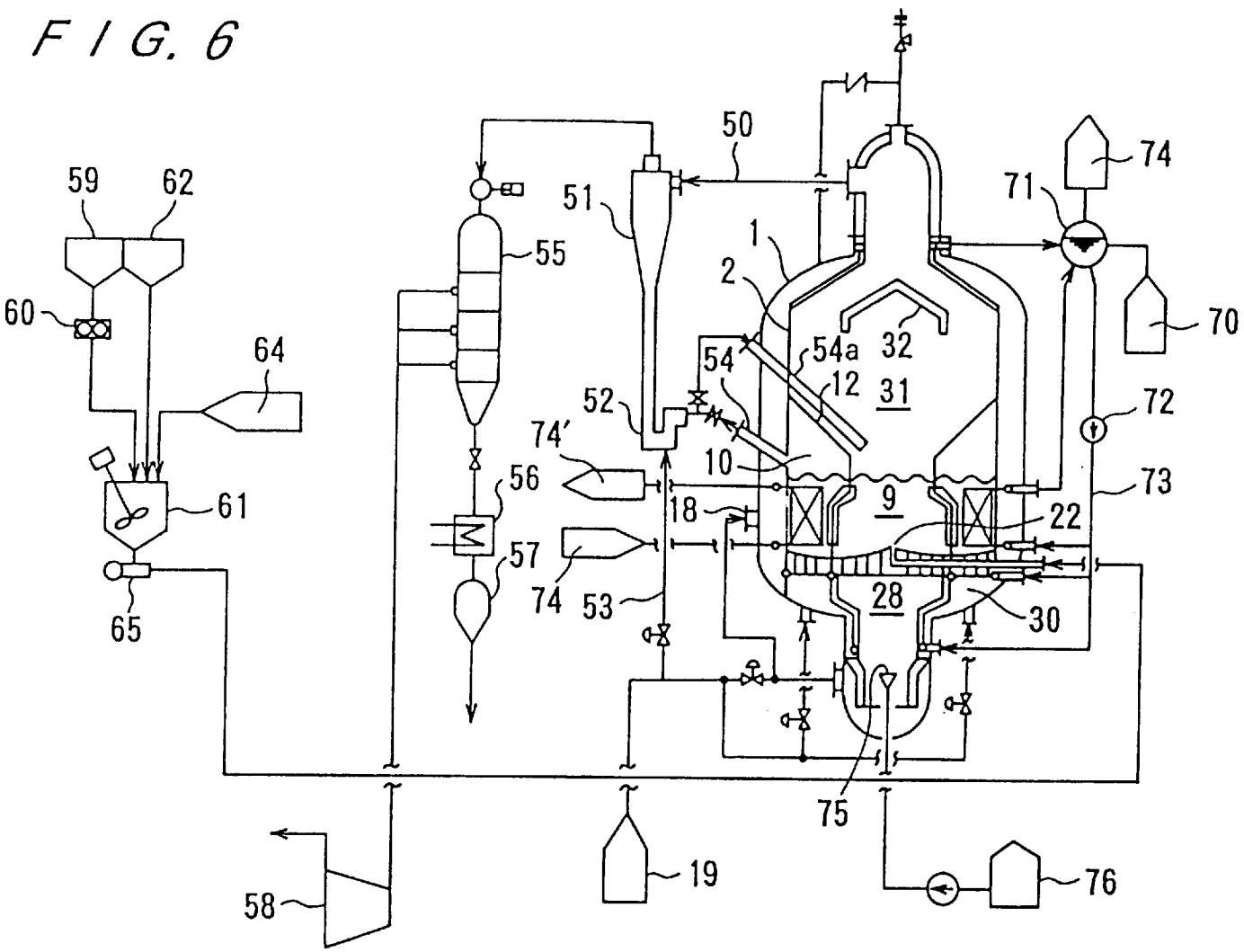
FIG. 6 is a system diagram of a combined-cycle electric generating system which incorporates a pressurized internal circulating fluidized-bed boiler according to a second embodiment of the present invention.

FIG. 6 shows a system diagram of a combined-cycle electric generating system which incorporates a pressurized internal circulating fluidized-bed boiler according to a second embodiment of the present invention.

As shown in FIG. 6, an exhaust gas discharged from a pressure vessel 1 is introduced through an exhaust gas flow path 50 into a cyclone 51. Flying ashes collected by the cyclone 51 fall by gravity and are stored in a seal mechanism 52, from which they are carried by ash recycling 53 and returned to a thermal energy recovery chamber 10 through a recycled ash inlet pipe 54 that extends through side walls of a pressure vessel 1 and a cylindrical combustor 2.

Since flying ashes are recycled into the thermal energy recovery chamber 10, the average diameter and specific gravity of particles in the thermal energy recovery chamber 10 are reduced. While the average diameter of particles in the main combustion chamber 9 is about 0.6 mm, the diameter of particles which are entrained by the exhaust gas, trapped by the cyclone, and recycled into the thermal energy recovery chamber 10 is much smaller. The specific gravity of those particles is small as they contain char.

Because the fluidizing gas velocity in the thermal energy recovery chamber 10 is low, about twice the minimum fluidizing gas velocity, the recycled particles are not entrained again, and hence the average diameter of particles in the thermal energy recovery chamber 10 are smaller than those in the main combustion chamber 9.

The minimum fluidizing gas velocity (Umf) is proportional to the square of the particle diameter of the fluidized medium and also the specific gravity thereof, so that the minimum fluidizing gas velocity in the thermal energy recovery chamber 10 is considerably smaller than that in the main combustion chamber 9. Consequently, the air flow rate for thermal energy recovery control may be considerably lower than if the flying ashes were not recycled into the thermal energy recovery chamber 10. As a result, the fluidizing gas velocity (U0) in the thermal energy recovery chamber 10 is lowered.

Inasmuch as the erosion rate of the immersed heat transfer tubes disposed in the thermal energy recovery chamber 10 is proportional to the cube of the fluidizing gas velocity (U0), the erosion rate of the immersed heat transfer tubes is greatly reduced when the fluidized gas velocity (U0) is lowered.

As shown in FIG. 3, the air flow rate for thermal energy recovery control, i.e., the thermal-energy-recovery air flow rate, fluctuates at all times as it controls the temperature of the fluidized bed in the main combustion chamber 9. The reduction in the thermal-energy-recovery air flow rate can minimize effects on the combustion energy when any change of the air flow rate occurs, and is highly effective to achieve a stable combustion.

As shown in FIG. 6, the exhaust gas is introduced through the cyclone 51 into a dust collector 55 which may comprise ceramic filters or high-temperature bag filters. Flying ashes collected by the dust collector 55 are cooled by an ash cooler 56 and discharged through a lock hopper 57 into the atmosphere. The high-temperature exhaust gas which has been filtered and made clean is introduced from the dust collector 55 into a gas turbine 58.

Coal stored as a fuel in a coal bunker 59 is crushed by a crusher 60 and sent to an agitating tank 61 in which it is mixed with a desulfurizer charged from a desulfurizer bunker 62 and water from a water tank 64, and the mixture is agitated into a slurry fuel. The slurry fuel is then delivered by a slurry pump 65 to the cylindrical combustor 2 where it is supplied from a fuel feeding port 22 into the fluidized bed in the main combustion chamber 9.

Further, it is possible to return flying ashes to the free board 31 by a recycled ash inlet pipe 54a. By this recycling, concentration of particles increases, agitation effect of the combustion gas is improved and the contacting chances of unburned char and unreacted desulfurizing agent increases, resulting in improving the combustion efficiency and performance of desulfurization and NOx reduction.

By making the recycled ash inlet pipe 54a to extend in the vicinity of the central part of the main combustion chamber 9, flying ashes can be supplied to a surface of moving bed or the inside of the moving bed. By allowing the fluidized medium to accompany flying ashes, it is possible for ashes to remain in the fluidized bed for a long period of time, thereby improving combustion of unburned materials and performance of desulfurization and NOx reduction.

Figure 7:
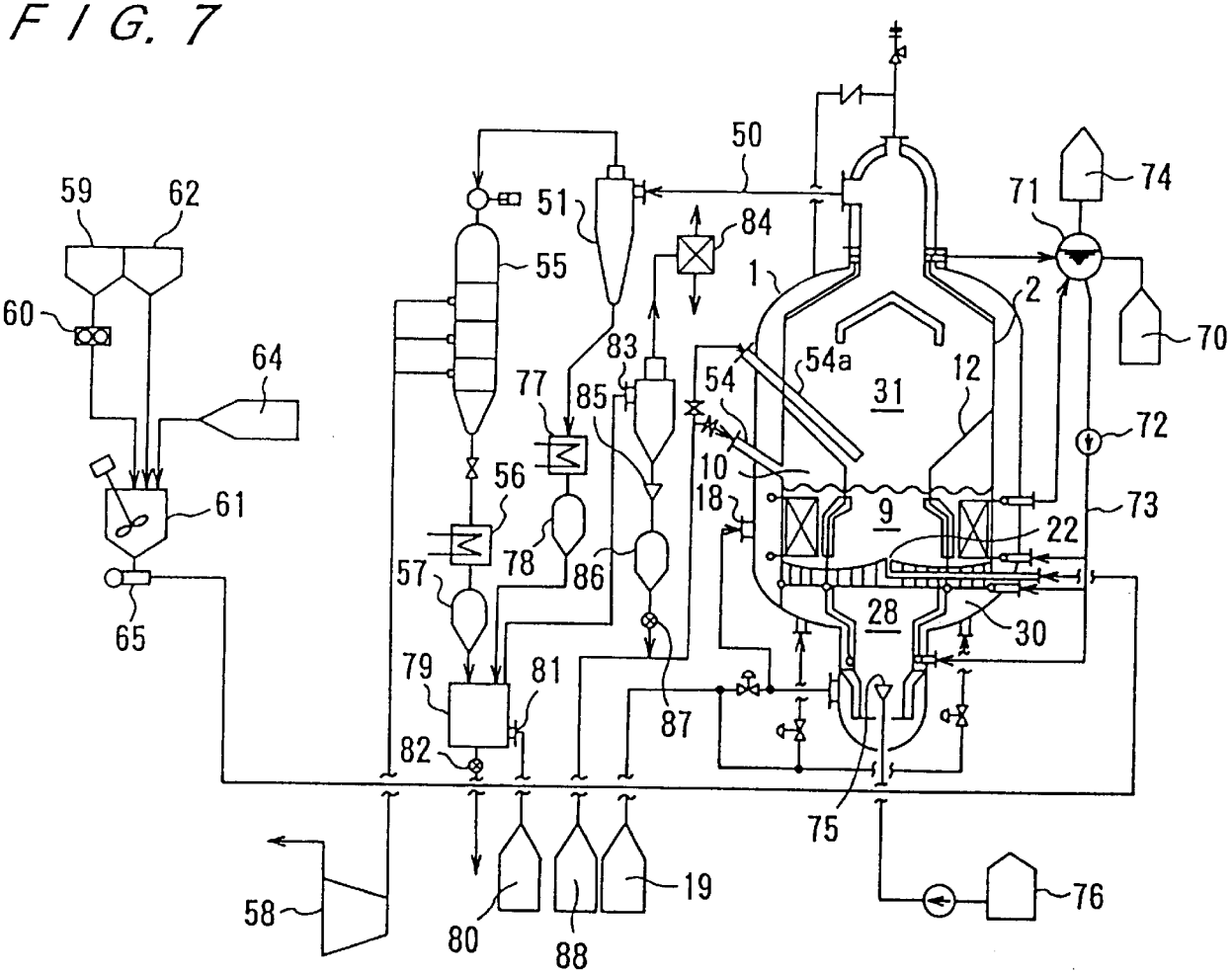
FIG. 7 is a system diagram of a combined-cycle electric generating system which incorporates a pressurized internal circulating fluidized-bed boiler according to a third embodiment of the present invention.
Figure 8:
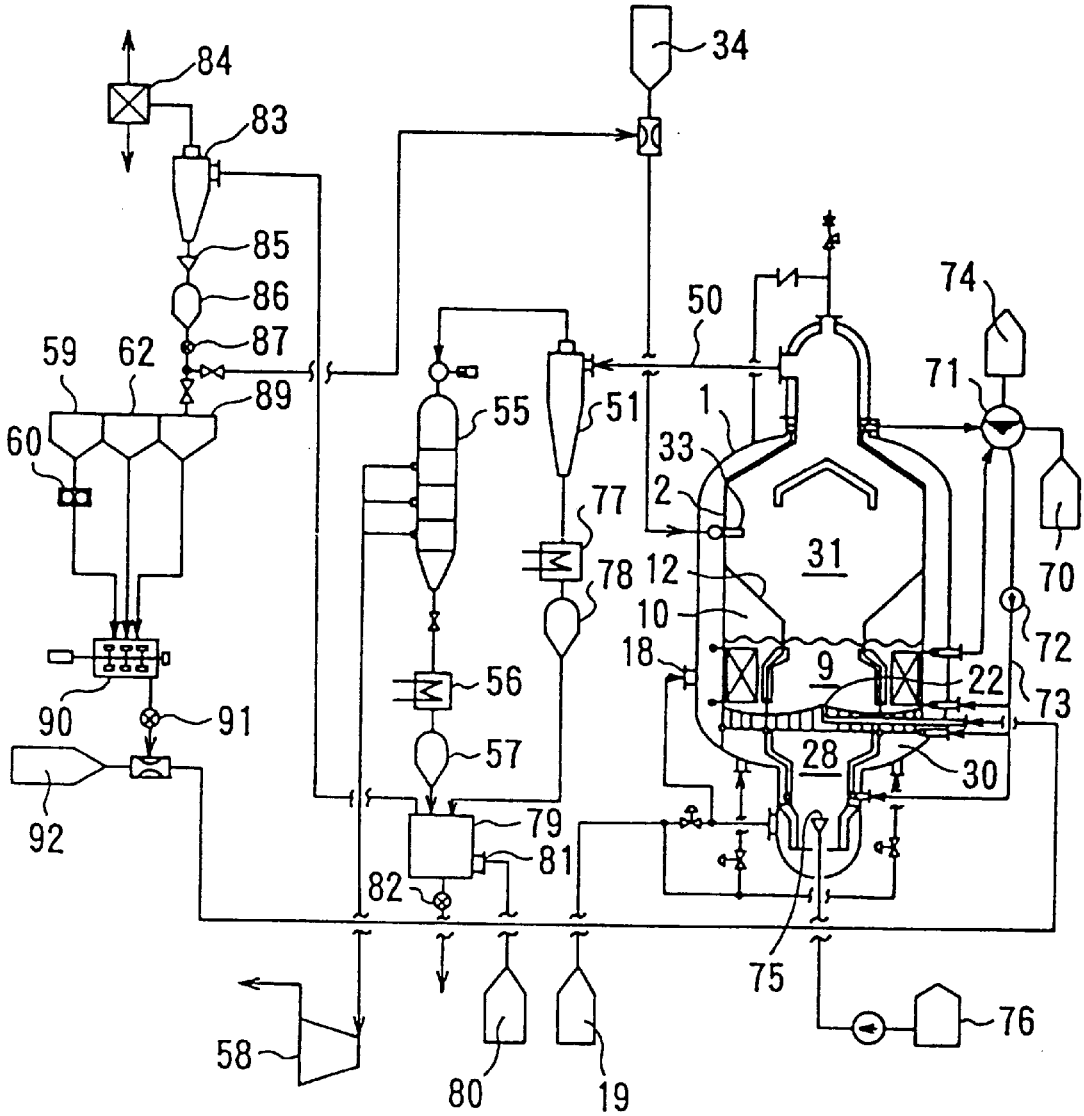
FIG. 8 is a modified system diagram of a combined-cycle electric generating system which incorporates a pressurized internal circulating fluidized-bed boiler according to a third embodiment of the present invention.

The pressurized internal circulating fluidized-bed boilers shown in FIGS. 6 through 8 are of the forced circulation type whereas the pressurized internal circulating fluidized-bed boiler shown in FIG. 1 is of the once-through type. In the forced-circulation boilers, there is a steam drum 71 supplied with water from a boiler water supply system 70, and water from the steam drum 71 is circulated through a forced-circulation pipe 73 into water walls and evaporation tubes in the thermal energy recovery chamber 10 by a forced-circulation pump 72.

Steam 74 generated in the steam drum 71 is delivered through a connecting pipe (not shown) to superheating tubes in the thermal energy recovery chamber 10 where superheated steam 74' is generated. The generated superheated steam 74' is then supplied to a high-pressure steam turbine.

(Third embodiment)

FIG. 7 illustrates a pressurized internal circulating fluidized-bed boiler according to a third embodiment of the present invention, the boiler including a system for processing an exhaust gas.

As shown in FIG. 7, flying ashes collected by a cyclone 51 in an exhaust gas flow path 50 are cooled by an ash cooler 77. A coolant used in the ash cooler 77 may be water supplied to the boiler or fluidizing air for effective recovery of the thermal energy from the ashes.

The cooled ashes are introduced through a lock hopper 78 into a classifying tank 79 in which they are mixed with flying ashes supplied from a dust collector 55 through an ash cooler 56 and a lock hopper 57, and the mixture is classified. In the illustrated embodiment, classifying air 80 is charged into the classifying tank 79 through an air diffuser pipe 81 for fluidized bed classification. However, this embodiment may not necessarily be limited to such type of classification.

Particles of unreacted desulfurizer and unburned carbon which have been selectively separated in the classifying tank 79 and have a diameter of 60 $\mu$m or smaller are carried to a cyclone 83 by air. The particles are further classified by the cyclone 83. Classified particles separated by the cyclone 83 which have a diameter of about 10 $\mu$m or smaller are introduced into a dust collector 84, separated from the air by the dust collector 84, and then discharged out of the dust collector 84. Flying ashes discharged from the cyclone 83 which have a diameter ranging from 10 to 60 $\mu$m are charged through a seal valve 85, a lock hopper 86, and a rotary valve 87 into a cylindrical combustor 2 by recycled ash delivery air 88. In the case where flying ashes is returned to the thermal energy recovery chamber 10 by the recycled ash inlet pipe 54, the same advantages stated in the embodiment in FIG. 6 can be obtained. By recycling of flying ashes to the free board 31 through recycled ash inlet pipe 54a, concentration of particles increases, agitation effect of the combustion gas is improved and the contacting chances of unburned char and unreacted desulfurizing agent increase, resulting in improving the combustion efficiency and performance of desulfurization and NOx reduction.

By making the recycled ash inlet pipe 54a to extend in the vicinity of the central part of the main combustion chamber 9, flying ashes can be supplied to a surface of moving bed or the inside of the moving bed. By allowing the fluidized medium to accompany flying ashes, it is possible for ashes to remain in the fluidized bed for a long period of time, thereby improving combustion of unburned materials and performance of desulfurization and NOx reduction.

In this manner, particles are classified into three groups by diameter. Since only those particles of highest char concentration which have a diameter ranging from 10 to 60 $\mu$m are returned to the cylindrical combustor 2, it is possible to reduce NOx and SOx emissions, lower erosion rate of the exhaust gas flow path, and increase the combustion efficiency with a minimum amount of circulating ashes.

While dust particles are collected in two steps by the cyclone 51 and the dust collector 55, the cyclone 51, the ash cooler 77, and the lock hopper 78 may be dispersed with, and only the dust collector 55 may be used to collect dust particles. In such a modification, the dust particles may be classified under pressure without being passed through the ash cooler 56 and the lock hopper 57. The dust collector 55 usually comprises ceramic filters.

FIG. 8 shows an other arrangement for processing classified flying ashes.

As shown in FIG. 8, particles of unreacted desulfurizer and unburned carbon which have been selectively separated in a classifying tank 79 and have a diameter of 60 $\mu$m or smaller are carried to a cyclone 83 by air. The particles are further classified by the cyclone 83. Classified particles separated by the cyclone 83 which have a diameter of about 10 $\mu$m or smaller are introduced into a dust collector 84, separated from the air by the dust collector 84, and then discharged out of the dust collector 84.

Flying ashes discharged from the cyclone 83 which have a diameter ranging from 10 to 60 $\mu$m are supplied through a seal valve 85, a lock hopper 86, and a rotary valve 87 into a hopper 89. Thereafter, the ashes discharged from the hopper 89 are mixed with coal and a desulfurizer into a fuel in the form of particles by a mixer 90. The fuel thus produced is then supplied to a cylindrical combustor 2 by fuel delivery air from an air tank 92.

Flying ashes discharged from the rotary valve 87 which have a diameter ranging from 10 to 60 $\mu$m may be supplied into the free board 31 by pneumatic transportation utilizing the secondary air 34.

(Fourth embodiment)

Figure 9:
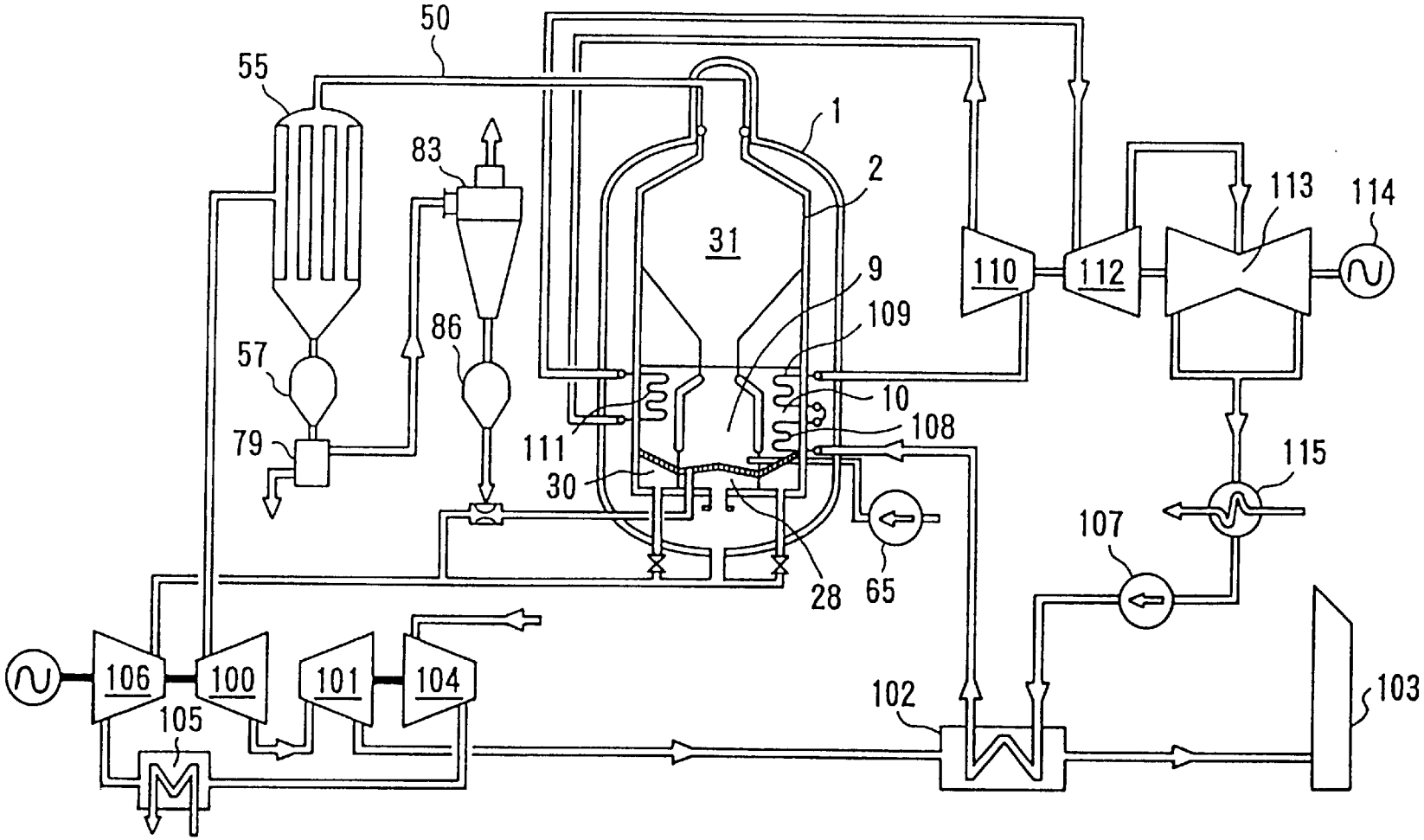
FIG. 9 is a system diagram of a combined-cycle electric generating system which incorporates a pressurized internal circulating fluidized-bed boiler according to a fourth embodiment of the present invention.

FIG. 9 shows an overall system of pressurized fluidized-bed boiler according to a fourth embodiment of the present invention.

As shown in FIG. 9, the pressurized fluidized-bed boiler is constructed as a once-through pressurized fluidized-bed boiler. During operation of the pressurized fluidized-bed boiler, a slurry fuel is fed by a slurry pump 65 to a combustor 2 where it is supplied to and combusted in a fluidized bed in a main combustion chamber 9. An exhaust gas produced when the fuel is combusted flows through an exhaust gas flow path 50, and is then filtered by a dust collector 55 which removes dust particles from the exhaust gas. Then, the exhaust gas drives a high-pressure gas turbine 100 and a low-pressure gas turbine 101, after which it heats water to be supplied to the boiler in an exhaust gas cooler 102. Thereafter, the exhaust gas is discharged into the atmosphere from a stack 103.

Fluidized bed combustion air is pressurized by low- and high-pressure compressors 104, 106 which are driven by the respective gas turbines 101, 100. Part of the air is branched as air for thermal energy recovery control and introduced into an air chamber 30 for thermal energy recovery control. The remaining air is introduced into an air chamber 28, combusting the fuel while causing a fluidized medium to swirl in the main combustion chamber 9.

In a steam generation system, water is supplied by a boiler water feed pump 107 to the exhaust gas cooler 102, and then heated there. The heated water is sent to the boiler in which it flows through water tubes that constitute a cylindrical wall, after which the water passes through evaporation tubes 108 and steam superheating tubes 109 during which time it becomes a superheated steam.

The produced superheated steam drives a high-pressure steam turbine 110, and then flows back to the combustor 2 where it is reheated by immersed heat transfer tubes 111. Thereafter, the steam drives a medium-pressure turbine 112 and a low-pressure turbine 113 to cause an electric generator 114 to generate electric energy. Then, the steam is condensed by a condenser 115 into water which is supplied again to the boiler.

(Fifth embodiment)

Figure 10:
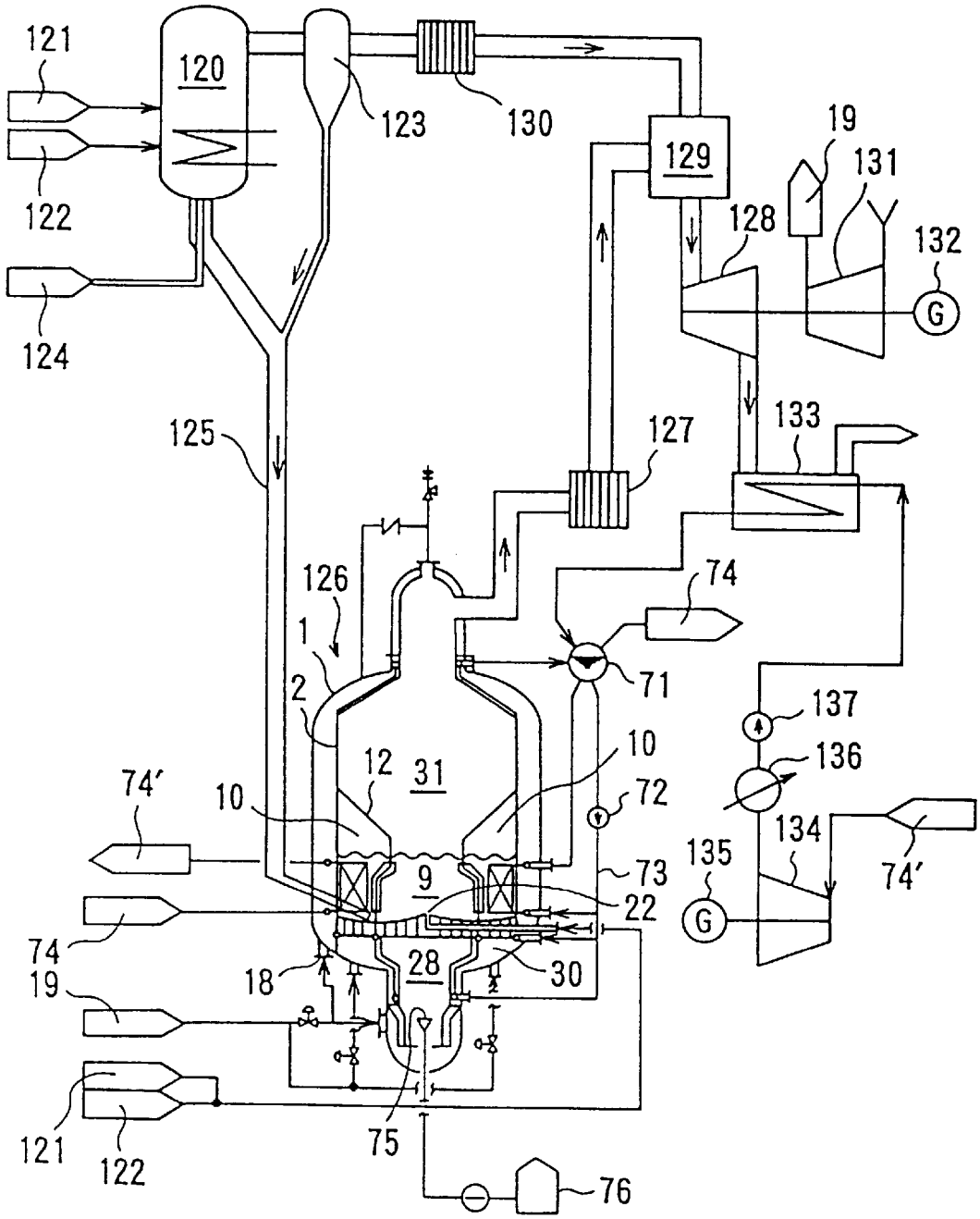
FIG. 10 is a system diagram of a topping-cycle combined electric generating system which incorporates a pressurized internal circulating fluidized-bed boiler as an oxidizer according to a fifth embodiment of the present invention.

FIG. 10 shows an internal circulating fluidized-bed boiler according to a fifth embodiment of the present invention, the boiler being incorporated as an oxidizer in a topping-cycle combined electric generating system.

Although not shown, a pressurized cylindrical fluidized-bed boiler according to the present invention may also be employed as a gasifier in the topping-cycle combined electric generating system shown in FIG. 10. Application to the gasifier will be described below. As described in detail above with reference to FIGS. 1 and 3, no heat transfer surface is disposed in the main combustion chamber 9 of the pressurized internal circulating fluidized-bed boiler according to the present invention. Therefore, the two-stage combustion is carried out for the purpose of reducing NOx, with the result that the fuel is combusted in the main combustion chamber 9 in a reducing atmosphere with an air ratio of about 0.8. Since different fluidized gas velocities are developed in the main combustion chamber 9, the substantial air ratio in the moving bed in the main combustion chamber 9 is about 0.5, a value close to that in the gasifier. Therefore, it is quite easy to convert the boiler into a topping-cycle gasifier. If no thermal energy recovery in the bed is required in view of a desired thermal balance, the supply of air for thermal energy recovery control may be stopped, or the immersed heat transfer tubes may be removed.

The internal circulating fluidized-bed boiler shown in FIG. 10 will be described below.

Coal from a coal bunker 121 and a desulfurizing agent from a desulfurizer bunk 122 are supplied to a gasifier 120, in which they are decomposed into a coal gas, char, and CaS by air 124.

The char and CaS are discharged from the gasifier 120, and a dust collector 123 connected to a coal gas passage, and introduced through a passage 125 into an oxidizer 126 in the form of the internal circulating fluidized-bed boiler where it is supplied in the vicinity of the furnace bed of a cylindrical combustor 2. The char and CaS may be supplied onto a fluidized bed, rather than in the vicinity of the furnace bed.

The oxidizer 126 may be supplied with coal from the coal bunker 121 and the desulfurizing agent from the desulfurizer bunk 122, which are charged through a fuel feeding port 22 into the main combustion chamber 9 where they are combusted with the char.

An exhaust gas produced in the oxidizer 126 is filtered by a dust collector 127, and thereafter introduced into a combustor 129 connected to the inlet of a gas turbine 128. In the combustor 129, the exhaust gas is mixed with the coal gas that has been discharged from the gasifier 120 and filtered by dust collectors 123, 130. The mixture is combusted, producing a high-temperature gas that drives the gas turbine 128 highly efficiently.

The gas turbine 128 in turn drives a compressor 131 and an electric generator 132. The exhaust gas discharged from the gas turbine 128 is cooled by a heat recovery unit 133, and then discharged into the atmosphere.

A superheated steam 74' generated in the boiler drives a steam turbine 134 and an electric generator 135 coupled thereto, after which it is condensed into water by a condenser 136. The water is then supplied again to the boiler by a boiler water feed pump 137. Operation of the pressurized cylindrical fluidized-bed boiler in the oxidizer 126 is the same as that of the boilers according to the first through fourth embodiments of the present invention.

(Sixth embodiment)

Figure 11:
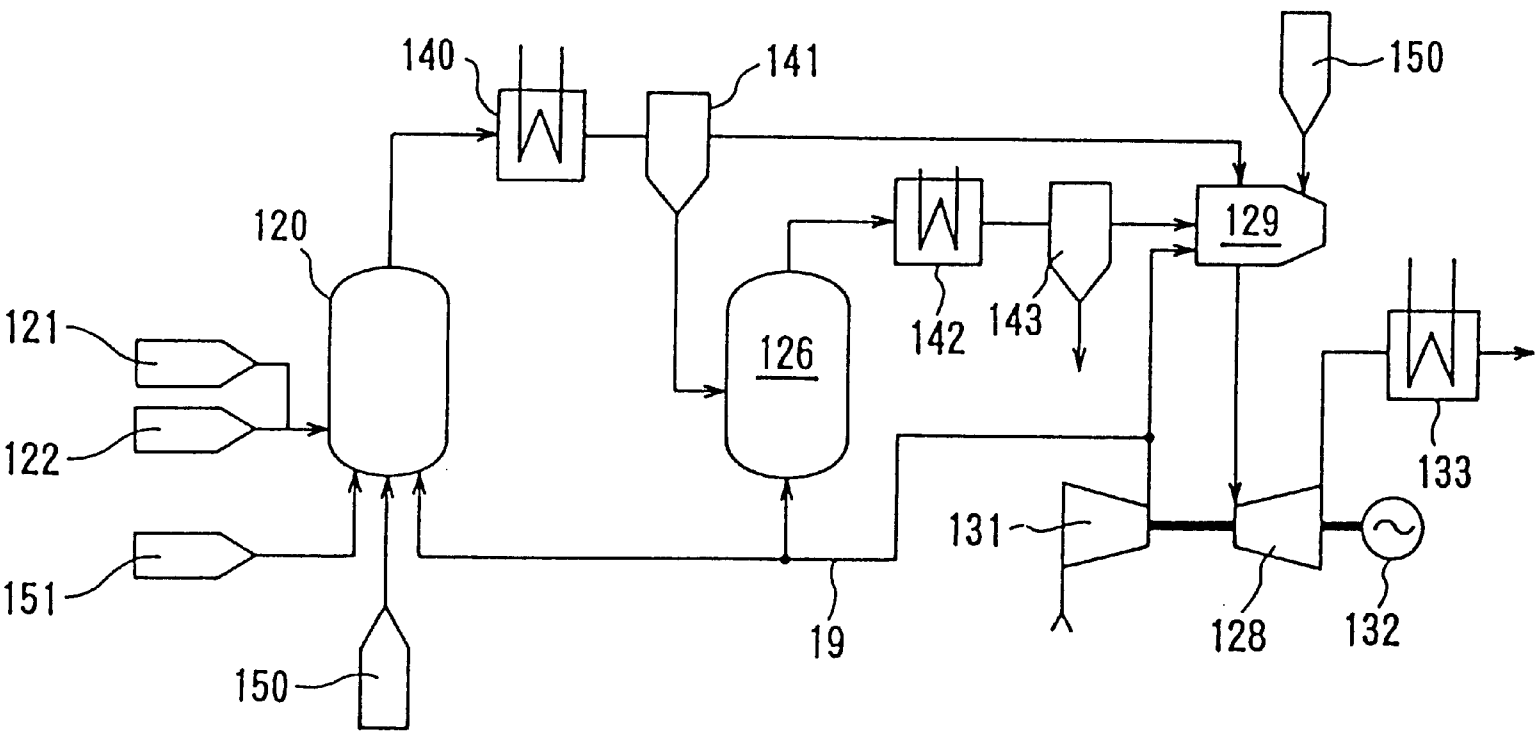
FIG. 11 is a system diagram of a topping-cycle combined electric generating system which incorporates a pressurized internal circulating fluidized-bed boiler as an oxidizer and an gasifier according to a sixth embodiment of the present invention.

FIG. 11 shows a pressurized cylindrical fluidized-bed boiler according to a sixth embodiment of the present invention, which is incorporated as a gasifier 120 and an oxidizer 126 in a topping-cycle combined electric generating system.

In FIG. 11, the gasifier 120 is supplied with coal from a coal burner 121 and a desulfurizer from a desulfurizer bunk 122. Air is also supplied to the gasifier 120 to partially combust the coal into a gas. Oxygen from an oxygen tank 150 or steam from a steam tank 151 may be charged as an oxidizing agent instead of air.

Unburned char, etc. generated in the gasifier 120 is entrained, in its entirety, by the generated gas and cooled to 600° C. or below by a gas cooling unit 140 that is connected downstream of the gasifier 120 for solidifying alkaline metal particles of Na, K, etc., which would be responsible to high-temperature corrosion of turbine blades, or fixing those alkaline metals to the surface of particles. Those particles are then collected by a dust collector 141 and introduced into the oxidizer 126 where they are completely combusted. An exhaust gas produced in the oxidizer 126 is discharged therefrom, and cooled to 600° C. or below by a gas cooling unit 142 that is connected downstream of the oxidizer 126. Alkaline metal particles of Na, K, etc. which are solidified when the exhaust gas is cooled by the gas cooling unit 142 are collected by and discharged from a particle dust collector 143. The dust collectors 141, 143 normally comprise ceramic filters.

The exhaust gas that has been purified by the removal of Na, K, etc. and the generated gas that has been filtered and cleaned after being discharged from the gasifier 120 are mixed and combusted by a combustor 129. Since these gases have been cooled, the combustion temperature at which they are combusted by the combustor 129 is slightly lowered. To prevent the combustion temperature from being unduly reduced, the oxidizer 126 is operated at as low excess air as possible to reduce the amount of an exhaust gas produced therein. Oxygen that is required by the combustor 129 is supplied from an oxygen tank 150 to the combustor 129.

A high-temperature exhaust gas produced by the combustor 129 drives a gas turbine 128 highly efficiently. The gas turbine 128 then drives a compressor 131 and an electric generator 132. The exhaust gas discharged from the gas turbine 128 is cooled by a thermal energy recovery unit 133, and then discharged into the atmosphere. If the turbine blades of the gas turbine 128 are of improved corrosion-resistant materials, then the gas cooling units 140, 142 may be dispensed with.

(Seventh embodiment)

Figure 12:
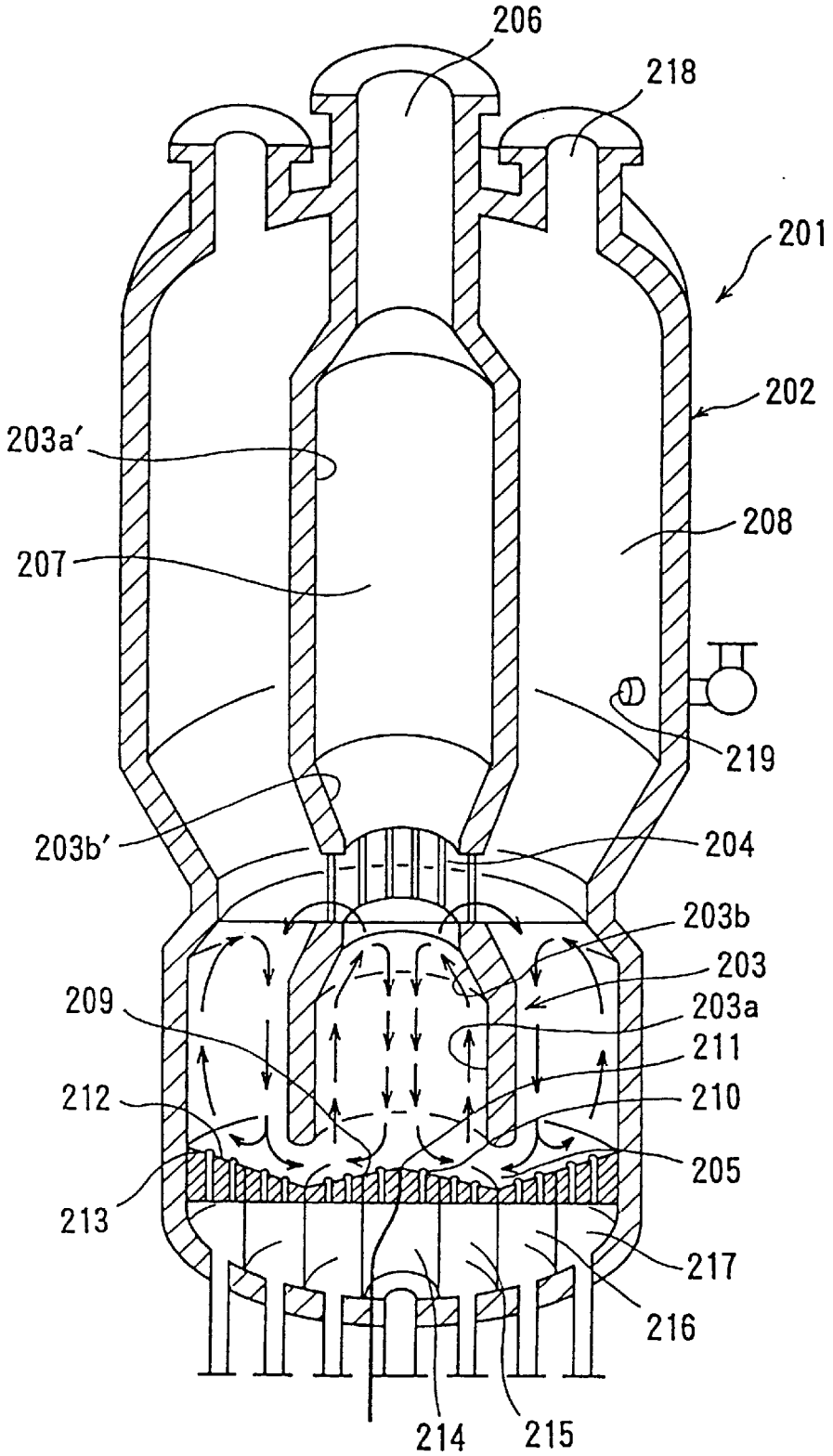
FIG. 12 is a cross-sectional view showing an integral furnace including an oxidizer and a gasifier for use in a topping-cycle combined electric generating system according to a seventh embodiment of the present invention.

FIG. 12 shows an integral furnace 201 which incorporates a gasifier and an oxidizer integrally and is used as a pressurized internal circulating fluidized-bed boiler for use in a topping-cycle combined electric generating system.

As shown in FIG. 12, a cylindrical fluidized-bed boiler 201 for use in a topping-cycle combined electric generating system has a cylindrical outer wall 202 and a partition 203 provided concentrically with the cylindrical outer wall 202. The partition 203 comprises a cylindrical partition 203a, a conical partition 203b, a conical partition 203b' and a cylindrical partition 203a'. A connection opening 204 is formed between the conical partition 203b and the conical partition 203b', and a connection opening 205 is formed underneath the cylindrical partition 203a. The upper end of the cylindrical partition 203a' is connected to the top of the cylindrical outer wall 202 and defines a gas outlet 206 therein.

The partition 203 separates an inner space serving as a gasifier 207 from an annular outer space serving as an oxidizer 208. A bottom face 209 of the gasifier 207 is conical in shape and a bottom face 212 of the oxidizer 208 is conical in shape. That is, the bottom face of overall furnace is of W-shaped profile in cross section.

Further, air supplying chambers 214–217 which are separately formed with one another are provided below the bottom faces 209 and 212 of the gasifier 207 and the oxidizer 208.

The volume of air to be blown out from air diffusion nozzles 210 is controlled in such a manner that the fluidizing gas velocity within the range of a concentric circle which has about half the diameter of the gasifier 207 slows to a velocity of approximately 1 to 2.5 times the minimum fluidizing gas velocity (Umf). The fluidizing gas velocity in the annular area surrounding the concentric circle achieves a high velocity of approximately 4 to 12 times the minimum fluidizing gas velocity (Umf).

Because of the above arrangement, the fluidized medium in the fluidized bed of the gasifier 207 starts to descend in the central part, and then slowly dispenses in all directions along the conically shaped bottom face of the gasifier 207 to reach the surrounding annular area, where due to the existing intense fluidization, the fluidized medium are forced to blow upward and moves along the inner face of the partition 203. At this time, since the conical partition 203b is formed at the upper section of the cylindrical partition 203a, the blowing force is concentrated to finally achieve its maximum level when reaching the surface of the fluidized bed where the fluidized medium forcibly reverses its course by reactive force to thus disperse horizontally in all directions as well as partly upward direction. As a result of this action, a large quantity of fluidized medium flows into the oxidizer 208 through the connection opening 204.

On the other hand, the fluidized medium of the gasifier 207 starts to descend in the central part in a state of cylindrical flow. As soon as the descending medium reaches the central part of the conical bottom face 209 of the gasifier 207, the medium start to disperse in all direction again. In this way, the internal circulation is formed as shown in FIG. 12. By this internal circulation, a fuel such as coal water paste supplied from a fuel feeding port 211 disperses in all directions uniformly in the gasifier 207. Therefore, even if the fuel supplying system has a simple structure, an uneven distribution of fuel is avoidable to thus prevent agglomeration.

A bottom face 212 of the oxidizer 208 is conical in shape and is provided with air diffusion nozzles 213 which fluidize the fluidized medium in the oxidizer 208. By injecting air from the air diffusion nozzles 213, the fluidized medium entering the oxidizer 208 through the connecting opening 204 starts to descend slowly through the fluidized bed of the oxidizer 208. The medium then passes through the connection opening 205 provided below the cylindrical partition 203a to return to the gasifier 207. In addition, supplemental air diffusion nozzles and an air supplying pipe connected to the nozzles may be installed on the outer surface of the conical partition 203b. In case of the conical partition 203b with a large inclined angle, such supplemental air diffusion nozzles are not necessarily provided.

By adjusting volume of air from air diffusion nozzles 213 provided on the bottom face 212 of the oxidizer 208 so that the fluidizing gas velocity within the range of an annular portion along the cylindrical outer wall 202 is larger than the fluidizing gas velocity within the range of an annular portion along the partition 203, the fluidized medium starts to descending along the partition 203 and is forced to blow upward and moves along the cylindrical outer wall 202, thereby forming a swirling flow. By this swirling flow, unburned char is completely combusted because of its long residence time.

In order to form the swirling flow, an air chamber 214 for forming a moving bed is provided below a central portion of the bottom face 209 of the gasifier 207 to supply a small volume of air, and an air chamber 215 for forming a fluidized bed is provided below the outer portion of the bottom face 209 of the gasifier 207. The air chambers 214 and 215 are communicated with each air inlet.

Further, an air chamber 216 is provided at the side of the partition 202 and an air chamber 217 is provided at the side of the cylindrical outer wall. The air chambers 216 and 217 serve to control fluidizing air flow rate. The cylindrical outer wall 202 has combustion gas outlets 218 connected to the oxidizer 208.

With the above arrangement, coal and desulfurizing agent are supplied to the gasifier 207 and circulated in the fluidized bed to thus produce coal gas and char. The coal gas is discharged from the gas outlet 206, and the bed material including the char is introduced through the connection opening 204 into the oxidizer 208. The char is completely combusted in the oxidizer 208 where it is circulated. Combustion gas is discharged from the combustion gas outlet 218. Secondary air nozzles 219 may be provided in a free board of the oxidizer 208 to perform two-stage combustion.

(Eighth embodiment)

Figure 13:
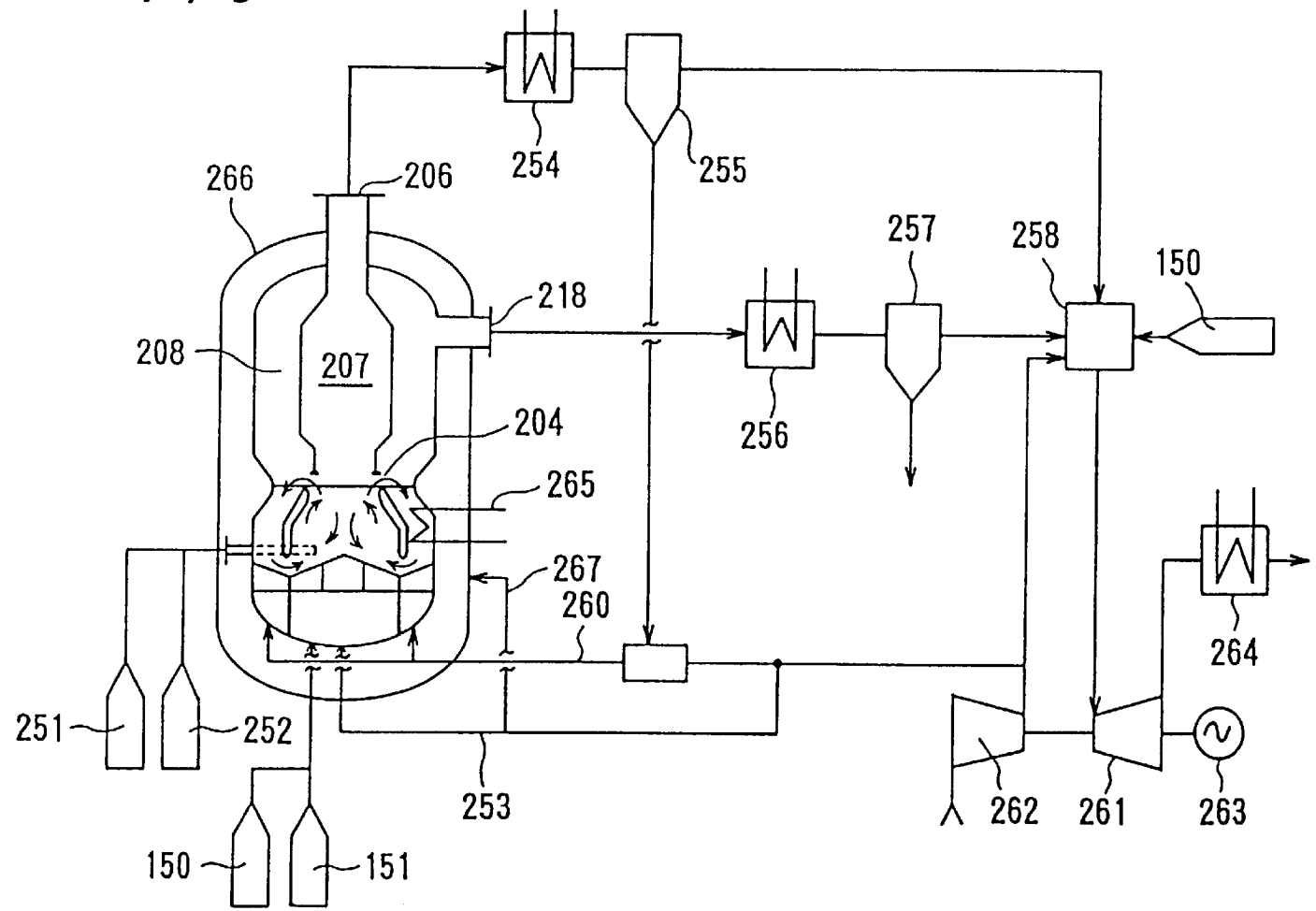
FIG. 13 is a system diagram of a topping-cycle combined electric generating system which incorporates the integral furnace including the oxidizer and the gasifier shown in FIG. 12 according to an eighth embodiment of the present invention.
Figure 14:
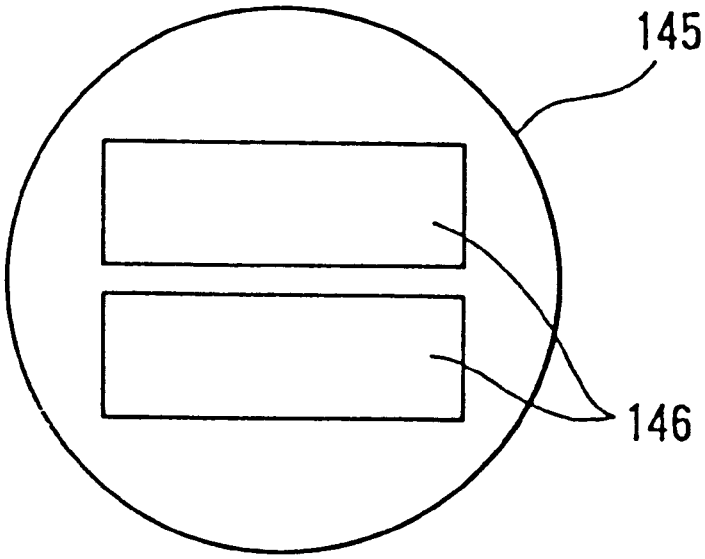
FIG. 14 is a plan view showing a conventional pressurized bubbling type fluidized-bed boiler.
Figure 15:
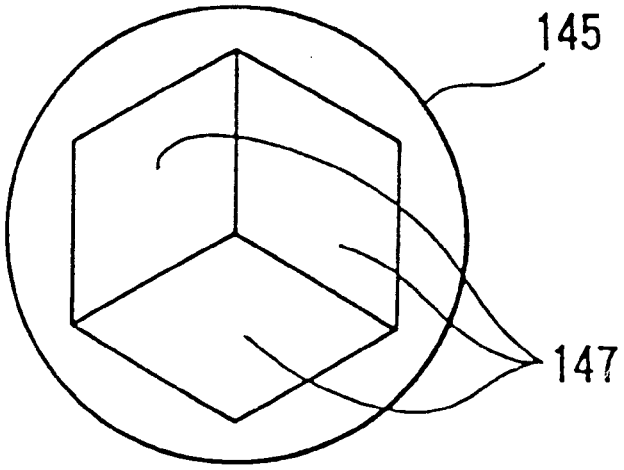
FIG. 15 is a plan view showing another conventional pressurized bubbling type fluidized-bed boiler.

FIG. 13 shows a system diagram of a topping-cycle combined electric generating system which incorporates the internal furnace shown in FIG. 12.

Coal 251 and desulfurizing agent 252 are supplied to the gasifier 207 and combusted partly and gasified by air 253 in the gasifier 207. Oxygen 150 or steam 151 may be supplied to the gasifier 207 as oxidizing agent or gasification agent.

Unburned char, etc. generated in the gasifier 207 is entrained, in its entirety, by the generated gas and cooled to 600° C. or below by a gas cooling unit 254 that is connected downstream of the gasifier 207 for solidifying alkaline metal particles of Na, K, etc., which would be responsible to high-temperature corrosion of turbine blades, or fixing those alkaline metals to the surface of particles. Those particles are then collected by a dust collector 255 and introduced by fluidizing air 260 into the oxidizer 208 where they are completely combusted. An exhaust gas produced in the oxidizer 208 is discharged therefrom, and cooled to 600° C. or below by a gas cooling unit 256 that is connected downstream of the oxidizer 208. Alkaline metal particles of Na, K, etc. which are solidified when the exhaust gas is cooled by the gas cooling unit 256 are collected by and discharged from a particle dust collector 257.

Particles caught by the dust collector 255 are supplied to the oxidizer 208 by pneumatic transportation. The dust collectors 255, 256 normally comprises a ceramic filter. The purified gas produced by removing Na, K which causes high temperature corrosion and combustion gas are mixed and combusted in a combustor 258, and high-temperature combustion gas is introduced into a gas turbine 261 driven in high efficiency. The gas turbine 261 drives in turn a compressor 262 and an electric generator 263. The exhaust gas from the gas turbine 261 is cooled by a heat recovery device 264 and discharged toward atmosphere. Gas cooling units 254 and 256 may be omitted if the turbine blades of the gas turbine 261 are of improved corrosion-resistant material.

Further, immersed heat transfer tubes man be disposed in the oxidizer 208. A pressure vessel 266 may be provided to accommodate the integral furnace 201 so that the integral furnace 201 does not require pressure-tight construction.

As is apparent from the above description, the present invention offers the following advantages:

(1) Since the main combustion chamber and the thermal energy recovery chamber are functionally separated from each other in the same combustor, the load can easily be controlled not by varying the height of the fluidized bed, but by varying the overall heat transfer coefficient of the immersed heat transfer tubes through the adjustment of an air fluidizing air flow rate into the thermal energy recovery chamber. Therefore, complex control processes and devices such as a bed material storage container for taking the fluidized medium into and out of the combustor are not required, and any agglomeration is prevented from being developed which would otherwise occur. When the fluidized medium is taken into and out of the combustor. As any change of the temperature of the fluidized bed is small even when the load varies, it is possible to operate the boiler under temperature conditions optimum for the suppression of NOx, SOx, and other undesirable emissions. Because the immersed heat transfer tubes are positioned only in the thermal energy recovery chamber where the fluidized bed is in a gradually flowing condition, the immersed heat transfer tubes are subject to less erode than would if they were placed in an intense fluidization.

(2) The fluidized medium flows as a dispersed flow from the center along the conical bottom face gradually in all directions, for thereby uniformly dispersing a fuel and a desulfurizing agent. Therefore, the combustion becomes uniform without developing an agglomeration. The number of coal feeding ports may be minimized, resulting in a highly simplified coal supply system.

(3) The fluidized medium on the surface of the fluidized bed of the main combustion chamber descend as a cylindrical flow in the vicinity of the center while entraining the surrounding fluidized medium. Therefore, the fuel and the desulfurizer remain in the fluidized bed for a long period of time for increased combustion efficiency and desulfurization efficiency.

(4) In the conventional rectangular internal circulating fluidized-bed boilers, the immersed heat transfer tubes are arranged on two confronting sides of a rectangular shape. According to the present invention, however, since the entire circumference is available for the placement of the heat transfer tubes, more heat transfer tubes can be installed, resulting in a more compact structure.

(5) In the conventional pressurized fluidized-bed boilers, the rectangular combustor having a water wall structure is housed in the pressure vessel, and sufficient reinforcements are necessary to protect the combustor against pressure differential between the inner and the outer of the combustor. According to the present invention, since the combustor is cylindrical in shape, it has a sufficient mechanical strength and may be reinforced with simple reinforcements. As the vessel container and the combustor are of a combination of circular shape, they do not create wasteful spaces, and may be arranged in a compact configuration.

(6) The comb-toothed screen, which is disposed in the free board in surrounding relation to the thermal energy recovery chamber, is effective to prevent a solid fuel such as coal particles of large diameter from entering the thermal energy recovery chamber. Accordingly, the development of an agglomeration can be avoided in the thermal energy recovery chamber. The screen serves as a baffle against an exhaust gas generated in the thermal energy recovery chamber, thus permitting the exhaust gas to be mixed and agitated sufficiently with an exhaust gas generated in the main combustion chamber.

(7) Since the internal circulating fluidized-bed boiler has no heat transfer surface in the main combustion chamber, it is possible to combust the fuel in a reducing atmosphere in the main combustion chamber. Therefore, volatile matter can actively be discharged in the main combustion chamber. Hydrocarbons such as $CH_4$, CO or gaseous N chemical species including NHi, HCN, etc. reduce Nitrogen oxides in gas phase reaction, and selectivity or probability for N chemical species to convert into oxides. Therefore, it is possible to effect a low-NOx combustion in the main combustion chamber.

(8) The immersed heat transfer tubes in the fluidized bed in the thermal energy recovery chamber are arranged radially and divided by function into a block of evaporating tubes, a block of steam superheating tubes, and a block of stream reheating tubes. With the tube groups being functionally divided as viewed in plan view, the amount of fluidizing air for thermal energy recovery can be adjusted in each of the blocks so that the amount of recovered heat can be controlled independently in each of the blocks.

(9) Where flying ashes collected by a particle separator disposed in the downstream end of the exhaust gas flow path are recycled to the thermal energy recovery chamber, the average diameter and specific gravity of particles in the thermal energy recovery chamber are reduced. As a result, the minimum fluidizing gas velocity is lowered, and the amount of fluidizing air for thermal energy recovery may be reduced. Erosion rate of the immersed heat transfer tubes is greatly reduced, and effects which any change in the amount of fluidizing air for thermal energy recovery may have on the combustion are reduced, which is highly effective to achieve a stable combustion.

(10) Flying ashes containing unburned carbon and an unreacted desulfurizing agent collected from the exhaust gas discharged from the combustor are classified. Only those flying ashes having a particle diameter ranging from 10 to 60 $\mu$m are returned to the combustor. Thus, it is possible to lower NOx, reduce erosion rate of the exhaust gas flow path, and increase the combustion efficiency with a minimum amount of circulating ashes. Consequently, any desulfurizing device may possibly be dispensed with, and the utilization efficiency of the desulfurizer for desulfurization in the furnace may be increased for an increased desulfurization rate.

(11) Flying ashes collected by the dust collector are cooled and thereafter classified under atmospheric pressure, and unburned carbon and an unreacted desulfurizing agent are selectively returned to the combustor. Accordingly, problems such as slugging which may occur when high-temperature particles are treated under high pressure can be avoided, and the amount of substances that are treated is reduced as only useful substances are recycled by classification. cation. Since those useful substances are recycled into the fuel supply system to the combustor, an other recycling system to the combustor is dispensed with, and the unreacted desulfurizing agent and the fuel are brought into good contact with each other for an increased desulfurization rate.

(12) In the topping-cycle combined electric generating system, the cylindrical internal circulating fluidized-bed boiler according to the present invention is used as a gasifier and/or an oxidizer. Unburned char discharged from the gasifier is entrained, in its entirety, by the generated gas and cooled to 600° C. or below, and collected by a downstream dust collector. Thereafter, the particles containing unburned char are introduced into the oxidizer where they are completely combusted. An exhaust gas produced in the oxidizer is discharged therefrom, and cooled to 600° C. or below. Particles containing Na, K, etc. entrained in the exhaust gas are collected by and discharged from a downstream dust collector. The purified exhaust gas and the generated gas which has been discharged from the gasifier and filtered to remove particles containing Na, K, etc. therefrom are mixed and burned in a topping-cycle combustor. A high-temperature exhaust gas produced by the topping-cycle combustor is introduced into a gas turbine. Inasmuch as the exhaust gas does not entrain particles containing alkaline metal such as Na, K, etc., which would otherwise be responsible to high-temperature corrosion of the turbine blades, the gas turbine may be made of conventional materials and designed in a conventional manner.

(13) In the cylindrical fluidized-bed frame in the pressurized fluidized-bed combined electric generating system, a partition wall concentric with the cylindrical outer wall is disposed in the fluidized bed, and connection openings are formed in intermediate and lower portions of the partition wall. The partition wall has an upper end held in contact with the ceiling of the cylindrical outer wall, defining a gas outlet. The space inward of the partition wall serves as a gasifier, and an annular space outward of the partition wall serves as an oxidizer. Therefore, while the cylindrical fluidized-bed furnace is a single furnace, it serves as a compound furnace which has two functions as the gasifier and the oxidizer and can operate highly efficiently.

What is claimed is:

1. A pressurized internal circulating fluidized-bed boiler for use in a combined-cycle electric generating system, comprising:

a pressure vessel;

a combustor disposed in said pressure vessel;

a main fluidized bed combustion chamber having an air diffusion device provided at the bottom of said combustor and adapted to inject fluidizing air upwardly under a mass flow that is at least greater at one side than that at another side;

an inclined partition wall provided above a portion of said air diffusion device where the mass flow is greater so as to interfere with the upward flow of the fluidizing air and thereby to deflect the air towards a portion above said another side of said air diffusion device where the mass flow is smaller;

a thermal energy recovery chamber partitioned from said main combustion chamber by said inclined partition wall;

a heat transfer surface means provided in said thermal energy recovery chamber for a passage of a heat receiving fluid therethrough;

an air diffuser provided at a lower portion of said thermal energy recovery chamber; and a free board provided integrally above said main combustion chamber and said thermal energy recovery chamber;

wherein said thermal energy recovery chamber is communicated at upper and lower portions thereof with said main fluidized bed combustion chamber, a moving bed is formed above the portion of said air diffusion device where the injected mass flow is smaller so that a fluidized medium descends and diffuses within the moving bed, and a circulating fluidized bed is formed above the portion of said air diffusion device where the mass flow of the fluidizing air is greater so that said fluidized medium is intensely fluidized and whirled towards a position above said moving bed and a part of said fluidized medium is introduced into said thermal energy recovery chamber beyond an upper portion of said inclined partition wall, the formation of said moving bed and said circulating fluidized bed is effected by regulation of the amount of air injected upwardly from said air diffusion device in said main combustion chamber and regulating of the fluidizing air injected from said air diffuser in said thermal energy recovery chamber causes the fluidized medium within said thermal energy recovery chamber to descend in a state of a moving bed for circulation to said main combustion chamber, and combustion gas from said main combustion chamber and said thermal energy recovery chamber is mixed in said free board.

2. The pressurized internal circulating fluidized-bed boiler according to claim 1, further comprising at least one secondary air supplying nozzle for supplying a secondary air into said free board so that combustion gas from said main combustion chamber and said thermal energy recovery chamber is mixed and unburned combustible materials in said combustion gas [is] *are* combusted.

3. The pressurized internal circulating fluidized-bed boiler according to claim 1, further comprising screening means provided between said main combustion chamber and said thermal energy recovery chamber for preventing combustible materials having a large grain size from entering said thermal energy recovery chamber, and for allowing combustion gas from said thermal energy recovery chamber to pass therethrough while regulating *a* stream of [said] *the* combustion gas and mixing with combustion gas from said main combustion chamber.

4. The pressurized internal circulating fluidized-bed boiler according to claim 2, further comprising an air supplying system for controlling *an* amount of combustion air to combust fuel at a predetermined air ratio in accordance with *an* amount of [said] *the* fuel to be supplied while maintaining oxygen concentration at a predetermined rate in exhaust gas discharged from said combustor, wherein by said air supplying system, the remaining amount of air is determined by subtracting *an* amount of air to be supplied to said air diffuser in said thermal energy recovery chamber from [said] *the* amount of combustion air and [said] *the* remaining amount of air is divided into *an* amount of air to be supplied to said air diffusion device in said main combustion chamber and *an* amount of air to be supplied to said free board as [a] secondary air.

5. The pressurized internal circulating fluidized-bed boiler according to claim 4, wherein [said] *the* amount of air to be supplied to said main combustion chamber is controlled so as to be less than a stoichiometric air flow rate.

6. The pressurized internal circulating fluidized-bed boiler according to claim 1, further comprising a baffle provided in said free board, wherein said baffle is positioned [at an]

upstream of a combustion gas outlet of said combustor to prevent *a* short-pass of combustion gas.

7. The pressurized internal circulating fluidized-bed boiler according to claim 1, further comprising a gas turbine driven by combustion gas of said combustor, wherein exhaust gas discharged from said gas turbine is mixed with combustion air to be supplied to said combustor.

8. The pressurized internal circulating fluidized-bed boiler according to claim 1, further comprising an equalizing nozzle for supplying a pressurized gas to a space between said pressure vessel and said combustor to balance [the inner and the outer] *pressures inwardly and outwardly* of said combustor.

9. The pressurized internal circulating fluidized-bed boiler according to claim 1, further comprising a dust collector provided in a passage of combustion gas discharged from said combustor, wherein flying ashes caught by said dust collector [is] *are* classified into three groups of larger, medium and smaller particle diameters, and only flying ashes of medium particle diameter [is] *are* returned to at least one of said main combustion chamber, said free board and a fuel supplying system for supplying fuel.

10. The pressurized internal circulating fluidized-bed boiler according to claim 1, further comprising a dust collector provided in a passage of combustion gas discharged from said combustor, wherein flying ashes caught by said dust collector [is] *are* returned to said thermal energy recovery chamber through an opening formed in said pressure vessel.

11. The pressurized internal circulating fluidized-bed boiler according to claim 1, further comprising a dust collector provided in a passage of combustion gas discharged from said combustor, wherein flying ashes caught by said dust collector [is] *are* returned to at least one of said main combustion chamber and said free board through an opening formed in said pressure vessel.

12. A pressurized internal circulating fluidized-bed boiler for use in a combined-cycle electric generating system, comprising:

a pressure vessel;

a combustor disposed in said pressure vessel and having a cylindrical outer wall;

a main fluidized bed combustion chamber having an air diffusion device provided at the bottom of said combustor and adapted to inject fluidizing air upwardly under a mass flow that is at least greater at an outer side than that at a central side;

a partition having a cylindrical partition and a conical partition formed at an upper portion of said cylindrical partition, said conical partition being provided above a portion of said air diffusion device where the mass flow is greater so as to interfere with the upward flow of the fluidizing air and thereby to deflect the air towards a portion above said central side of said air diffusion device where the mass flow is smaller;

an annular thermal energy recovery chamber partitioned from said main combustion chamber by said partition;

a heat transfer surface means provided in said thermal energy recovery chamber for a passage of a heat receiving fluid therethrough; and an air diffuser provided at a lower portion of said thermal energy recovery chamber;

wherein said thermal energy recovery chamber is communicated at upper and lower portions thereof with said main fluidized bed combustion chamber, a moving bed is formed above the portion of said air diffusion device where the injected mass flow is smaller so that a fluidized medium descends and diffuses within the moving bed, and a circulating fluidized bed is formed above the portion of said air diffusion device where the mass flow of the fluidizing air is greater so that said fluidized medium is intensely fluidized and whirled towards a position above said moving bed and a part of said fluidized medium is introduced into said thermal energy recovery chamber beyond an upper portion of said conical partition, the formation of said moving bed and said circulating fluidized bed is effected by regulation of the amount of air injected upwardly from said air diffusion device in said main combustion chamber and regulating of the fluidizing air injected from said air diffuser in said thermal energy recovery chamber causes the fluidized medium within said thermal energy recovery chamber to descend in a state of a moving bed for circulation to said main combustion chamber.

13. The pressurized internal circulating fluidized-bed boiler according to claim 12, wherein said air diffusion device is provided on a bottom face of said main combustion chamber, and said bottom face is conical in shape.

14. The pressurized internal circulating fluidized-bed boiler according to claim 12, further comprising a free board provided integrally above said main combustion chamber and said thermal energy recovery chamber, wherein combustion gas from said main combustion chamber and said thermal energy recovery chamber is mixed in said free board.

15. The pressurized internal circulating fluidized-bed boiler according to claim 14, further comprising at least one secondary air supplying nozzle for supplying a secondary air into said free board so that combustion gas from said main combustion chamber and said thermal energy recovery chamber is mixed and unburned combustible materials in said combustion gas [is] *are* combusted.

16. The pressurized internal circulating fluidized-bed boiler according to claim 14, further comprising screening means provided between said main combustion chamber and said thermal energy recovery chamber for preventing combustible materials having a large grain size from entering said thermal energy recovery chamber, and for allowing combustion gas from said thermal energy recovery chamber to pass therethrough while regulating *a* stream of [said] *the* combustion gas and mixing with combustion gas from said main combustion chamber.

17. The pressurized internal circulating fluidized-bed boiler according to claim 15, further comprising an air supplying system for controlling *an* amount of combustion air to combust fuel at a predetermined air ratio in accordance with *an* amount of [said] *the* fuel to be supplied while maintaining oxygen concentration at a predetermined rate in exhaust gas discharged from said combustor, wherein by said air supplying system, the remaining amount of air is determined by subtracting *an* amount of air to be supplied to said air diffuser in said thermal energy recovery chamber from [said] *the* amount of combustion and [said] *the* remaining amount of air is divided into *an* amount of air to be supplied to said air diffusion device in said main combustion chamber and *an* amount of air to be supplied to said free board as [a] secondary air.

18. The pressurized internal circulating fluidized-bed boiler according to claim 17, wherein [said] *the* amount of air to be supplied to said main combustion chamber is controlled so as to be less than a stoichiometric air flow rate.

19. The pressurized internal circulating fluidized-bed boiler according to claim 14, further comprising a baffle provided in said free board, wherein said baffle is positioned [at an] upstream of a combustion gas outlet of said combustor to prevent *a* short-pass of combustion gas.

20. The pressurized internal circulating fluidized-bed boiler according to claim 12, further comprising an equalizing nozzle for supplying a pressurized gas to a space between said pressure vessel and said combustor to balance [the inner and an outer] *pressures inwardly and outwardly* of said combustor.

21. The pressurized internal circulating fluidized-bed boiler according to claim 12, wherein said air diffuser is provided on a bottom face of said thermal energy recovery chamber, said bottom face is inclined inwardly toward said main combustion chamber, and a lowermost bottom face of said thermal energy recovery chamber faces a connection opening for returning fluidized medium from said thermal energy recovery chamber to said main combustion chamber.

22. The pressurized internal circulating fluidized-bed boiler according to claim 21, further comprising an air diffuser provided at said connection opening for enabling fluidized medium to be fluidized in said connecting opening.

23. The pressurized internal circulating fluidized-bed boiler according to claim 12, wherein said heat transfer surface means comprises heat transfer tubes which are installed in a radial pattern, said heat transfer tubes are divided into a plurality of blocks for use as a block of evaporating tubes, a block of steam superheating tubes and a block of steam reheating tubes.

24. The pressurized internal circulating fluidized-bed boiler according to claim 13, wherein a fuel inlet for supplying fuel to said main combustion chamber is provided in the vicinity of said bottom face of said main combustion chamber.

25. The pressurized internal circulating fluidized-bed boiler according to claim 12, further comprising a dust collector provided in a passage of combustion gas discharged from said combustor, wherein flying ashes caught by said dust collector [is] *are* returned to said thermal energy recovery chamber through an opening formed in said pressure vessel.

26. The pressurized internal circulating fluidized-bed boiler according to claim 14, further comprising a dust collector provided in a passage of combustion gas discharged from said combustor, wherein flying ashes caught by said dust collector [is] *are* returned to at least one of said main combustion chamber and said free board through an opening formed in said pressure vessel.

27. The pressurized internal circulating fluidized-bed boiler according to claim 14, further comprising a dust collector provided in a passage of combustion gas discharged from said combustor, wherein flying ashes caught by said dust collector [is] *are* mixed with a secondary air and *a* mixture of [said] *the* flying ashes and [said] secondary air is supplied to said free board through an opening formed in said pressure vessel.

28. The pressurized internal circulating fluidized-bed boiler according to claim 12, further comprising a dust collector provided in a passage of combustion gas discharged from said combustor for collecting flying ashes and a classifier for recovering unreacted desulfurizing agent and unburned carbon from [said] *the* ashes.

29. The pressurized internal circulating fluidized-bed boiler according to claim 28, wherein unreacted desulfurizing agent and unburned carbon recovered by said classifier are returned to one of said main combustion chamber and a fuel supplying system for supplying fuel.

30. The pressurized internal circulating fluidized-bed boiler according to claim 12, further comprising a dust collector provided in a passage of combustion gas discharged from said combustor, wherein flying ashes caught by said dust collector [is] *are* classified into three groups of larger, medium and smaller particle diameters, and only flying ashes of medium particle diameter [is] *are* returned to at least one of said main combustion chamber, said free board and a fuel supplying system for supplying fuel.

31. A topping-cycle combined electric generating system including a gasifier for generating a gas and char, an oxidizer for combusting [said] *the* char to produce combustion gas, and a gas turbine which is driven by a high-temperature gas produced by combusting *a* mixture of [said] *the* generated gas and [said] *the* combustion gas, at least one of said gasifier and said oxidizer comprising a pressurized internal circulating fluidized-bed boiler which comprises:

a pressure vessel;

a combustor disposed in said pressure vessel and having a cylindrical outer wall;

a main fluidized bed combustion chamber having an air diffusion device provided at the bottom of said combustor and adapted to inject fluidizing air upwardly under a mass flow that is at least greater at an outer side than that at a central side;

a partition having a cylindrical partition and a conical partition formed at an upper portion of said cylindrical partition, said conical partition being provided above a portion of said air diffusion device where the mass flow is greater so as to interfere with the upward flow of the fluidizing air and thereby to deflect the air towards a portion above said central side of said air diffusion device where the mass flow is smaller;

an annular thermal energy recovery chamber partitioned from said main combustion chamber by said partition;

a heat transfer surface means provided in said thermal energy recovery chamber for a passage of a heat receiving fluid therethrough; and an air diffuser provided at a lower portion of said thermal energy recovery chamber;

wherein said thermal energy recovery chamber is communicated at upper and lower portions thereof with said main fluidized bed combustion chamber, a moving bed is formed above the portion of said air diffusion device where the injected mass flow is smaller so that a fluidized medium descends and diffuses within the moving bed, and a circulating fluidized bed is formed above the portion of said air diffusion device where the mass flow of the fluidizing air is greater so that said fluidized medium is intensely fluidized and whirled towards a position above said moving bed and a part of said fluidized medium is introduced into said thermal energy recovery chamber beyond an upper portion of said conical partition, the formation of said moving bed and said circulating fluidized bed is effected by regulation of the amount of air injected upwardly from said air diffusion device in said main combustion chamber and regulating of the fluidizing air injected from said air diffuser in said thermal energy recovery chamber causes the fluidized medium within said thermal energy recovery chamber to descend in a state of a moving bed for circulation to said main combustion chamber.

32. The topping-cycle combined electric generating system according to claim 31, wherein unburned char [discharge] *discharged* from said gasifier is entrained, in its entirety, by [said] *the* generated gas and cooled, and particles containing char, Na and K are collected by a downstream dust collector, and [said] *the* particles are introduced into said oxidizer where they are completely combusted, and an exhaust gas produced in said oxidizer is discharged therefrom and cooled, and particles containing at least Na, K contained in [said] *the* exhaust gas are collected by and discharged from a downstream dust collector, and purified exhaust gas and [said] *the* generated gas which has been discharged from said gasifier and filtered to remove particles therefrom are mixed and combusted by a topping-combustor, and then a high-temperature exhaust gas produced by said combustor is introduced into said gas turbine.

33. An integral type of fluidized-bed furnace for use in a topping-cycle combined electric generating system, comprising:

a cylindrical outer wall;

a cylindrical partition provided concentrically with said cylindrical outer wall;

a gasifier formed inside said cylindrical partition;

an oxidizer formed between said cylindrical outer wall and said cylindrical partition;

an air diffusion device provided at the bottom of said gasifier and adapted to inject fluidizing air upwardly under a mass flow that is at least greater at an outer side than that at a central side;

a conical partition formed on said cylindrical partition, said conical partition being provided above a portion of said air diffusion device where the mass flow is greater so as to interfere with the upward flow of the fluidizing air and thereby to deflect the air towards a portion above said central side of said air diffusion device where the mass flow is smaller;

an air diffuser provided at a lower portion of said oxidizer; and a first free board defined above said gasifier and a second free board defined above said oxidizer, said first and second free boards being separated from each other by said cylindrical partition so that a gas produced by said gasifier and combustion gas from said oxidizer are separately discharged towards the outside;

wherein said oxidizer is communicated at intermediate and lower portions thereof with said gasifier, a moving bed is formed above the portion of said air diffusion device where the injected mass flow is smaller so that a fluidized medium descends and diffuses within the moving bed, and a circulating fluidized bed is formed above the portion of said air diffusion device where the mass flow of the fluidizing air is greater so that said fluidized medium is intensely fluidized and whirled towards a position above said moving bed and a part of said fluidized medium is introduced into said oxidizer through an opening formed in an intermediate portion of said partition, the formation of said moving bed and said circulating fluidized bed is effected by regulating of the amount of air injected upwardly from said air diffusion device is said gasifier and regulating of the fluidizing air injected from said air diffuser in said oxidizer causes the fluidized medium within said oxidizer to descend in a state of a moving bed for circulation to said gasifier.

34. The fluidized-bed furnace according to claim 33, further comprising a heat transfer surface means provided in said oxidizer for a passage of a heat receiving fluid therethrough.

35. The fluidized-bed furnace according to claim 33, further comprising a pressure vessel for accommodating said fluidized-bed furnace, wherein said pressure vessel has a combustion gas outlet and a produced gas outlet, said combustion gas outlet is connected to said oxidizer and said produced gas outlet is connected to said gasifier.

36. The fluidized-bed furnace according to claim 33, wherein unburned car discharged from said gasifier is entrained, in its entirety, by [said] *the* generated gas and cooled, and particles containing char, Na and K are collected by a downstream dust collector, and [said] *the* particles are introduced into said oxidizer where they are completely combusted, and an exhaust gas produced in said oxidizer is discharged therefrom and cooled, and particles containing at least Na, K in [said] *the* exhaust gas are collected by and discharged from a downstream dust collector, and purified exhaust gas and [said] *the* generated gas which has been discharged from said gasifier and filtered to remove particles therefrom are mixed and combusted by a topping-combustor, and then a high-temperature exhaust gas produced by said combustor is introduced into said gas turbine.

*37. A pressurized cylindrical internal circulating fluidized-bed boiler for use in a combined cycle electric generating system, comprising:*

*a pressure vessel;*

*a combustor disposed in said pressure vessel;*

*a main fluidized bed combustion chamber having an air diffusion device provided at the bottom of said combustor and adapted to inject fluidizing air upwardly under a mass flow that is at least greater at one side than that at another side;*

*a partition wall provided above a portion of said air diffusion device;*

*a thermal energy recovery chamber partitioned from said main combustion chamber by said partition wall;*

*a heat transfer surface means provided in said thermal energy recovery chamber for a passage of a heat receiving fluid therethrough;*

*an air diffuser provided at a lower portion of said thermal energy recovery chamber; and*

*a free board provided above said main combustion chamber and said thermal energy recovery chamber;*

*wherein said thermal energy recovery chamber is communicated at upper and lower portions thereof with said main fluidized bed combustion chamber, a moving bed is formed above a portion of said air diffusion device where the injected mass flow is smaller so that a fluidized medium descends and diffuses within the moving bed, and a circulating fluidized bed is formed above a portion of said air diffusion device where the mass flow of the fluidizing air is greater so that said fluidized medium is intensely fluidized and whirled towards a position above said moving bed and a part of said fluidized medium is introduced into said thermal energy recovery chamber beyond an upper portion of said partition wall, the formation of said moving bed and said circulating fluidized bed is effected by regulation of the amount of air injected upwardly from said air diffusion device in said main combustion chamber and regulation of the fluidizing air injected from said air diffuser in said thermal energy recovery chamber causes the fluidized medium within said thermal energy recovery chamber to descend in a state of a moving bed for circulation to said main combustion chamber, and combustion gas from said main combustion chamber and said thermal energy recovery chamber is mixed in said free board.*

*38. The pressurized internal circulating fluidized-bed boiler according to claim 37, further comprising at least one secondary air supplying nozzle for supplying a secondary*

*air into said free board so that combustion gas from said main combustion chamber and said thermal energy recovery chamber is mixed and unburned combustible materials in said combustion gas are combusted.*

*39. The pressurized internal circulating fluidized-bed boiler according to claim 38, further comprising an air supplying system for controlling an amount of combustion air to combust fuel at a predetermined air ratio in accordance with an amount of the fuel to be supplied while maintaining oxygen concentration at a predetermined rate in exhaust gas discharged from said combustor, wherein by said air supplying system, the remaining amount of air is determined by subtracting an amount of air to be supplied to said air diffuser in said thermal energy recovery chamber from the amount of combustion air and the remaining amount of air is divided into an amount of air to be supplied to said air diffusion device in said main combustion chamber and an amount of air to be supplied to said free board as secondary air.*

*40. The pressurized internal circulating fluidized-bed boiler according to claim 39, wherein the amount of air to be supplied to said main combustion chamber is controlled so as to be less than a stoichiometric air flow rate.*

*41. The pressurized internal circulating fluidized-bed boiler according to claim 37, further comprising screening means provided between said main combustion chamber and said thermal energy recovery chamber for preventing combustible materials having a large grain size from entering said thermal energy recovery chamber, and for allowing combustion gas from said thermal energy recovery chamber to pass therethrough while regulating a stream of the combustion gas and mixing with combustion gas from said main combustion chamber.*

*42. The pressurized internal circulating fluidized-bed boiler according to claim 37, further comprising a baffle provided in said free board, wherein said baffle is positioned upstream of a combustion gas outlet of said combustor to prevent a short-pass of combustion gas.*

*43. The pressurized internal circulating fluidized-bed boiler according to claim 37, further comprising a gas turbine driven by combustion gas of said combustor, wherein exhaust gas discharged from said gas turbine is mixed with combustion air to be supplied to said combustor.*

*44. The pressurized internal circulating fluidized-bed boiler according to claim 37, further comprising an equalizing nozzle for supplying a pressurized gas to a space between said pressure vessel and said combustor to balance pressures inwardly and outwardly of said combustor.*

*45. The pressurized internal circulating fluidized-bed boiler according to claim 37, further comprising a dust collector provided in a passage of combustion gas discharged from said combustor, wherein flying ashes caught by said dust collector are classified into three groups of larger, medium and smaller particle diameters, and only flying ashes of medium particle diameter are returned to at least one of said main combustion chamber, said free board and a fuel supplying system for supplying fuel.*

*46. The pressurized internal circulating fluidized-bed boiler according to claim 37, further comprising a dust collector provided in a passage of combustion gas discharged from said combustor, wherein flying ashes caught by said dust collector are returned to said thermal energy recovery chamber through an opening formed in said pressure vessel.*

*47. The pressurized internal circulating fluidized-bed boiler according to claim 37, further comprising a dust collector provided in a passage of combustion gas discharged from said combustor, wherein flying ashes caught by said dust collector are returned to at least one of said main combustion chamber and said free board through an opening formed in said pressure vessel.*

*48. A pressurized internal circulating fluidized-bed boiler according to claim 37, wherein said partition has a cylindrical partition and a conical partition formed at an upper portion of said cylindrical partition, said conical partition being provided above a portion of said air diffusion device where the mass flow is greater so as to interfere with the upward flow of the fluidizing air and thereby to deflect the air towards a portion above a central part of said air diffusion device where the mass flow is smaller, and wherein said thermal energy recovery chamber partitioned from said main combustion chamber by said partition is annular.*

*49. The pressurized internal circulating fluidized-bed boiler according to claim 48, wherein said air diffusion device is provided on a bottom face of said main combustion chamber, and said bottom face is conical in shape.*

*50. The pressurized internal circulating fluidized-bed boiler according to claim 49, wherein a fuel inlet for supplying fuel to said main combustion chamber is provided in the vicinity of said bottom face of said main combustion chamber.*

*51. The pressurized internal circulating fluidized-bed boiler according to claim 48, wherein said free board is provided integrally above said main combustion chamber and said thermal energy recovery chamber.*

*52. The pressurized internal circulating fluidized-bed boiler according to claim 51, further comprising a dust collector provided in a passage of combustion gas discharged from said combustor, wherein flying ashes caught by said dust collector are mixed with secondary air, and a mixture of said flying ashes and said secondary air is supplied to said free board through an opening formed in said pressure vessel.*

*53. The pressurized internal circulating fluidized-bed boiler according to claim 48, wherein said air diffuser is provided on a bottom face of said thermal energy recovery chamber, said bottom face is inclined inwardly toward said main combustion chamber, and a lowermost bottom face of said thermal energy recovery chamber faces a connection opening for returning fluidized medium from said thermal energy recovery chamber to said main combustion chamber.*

*54. The pressurized internal circulating fluidized-bed boiler according to claim 53, further comprising an air diffuser provided at said connection opening for enabling fluidized medium to be fluidized in said connecting opening.*

*55. The pressurized internal circulating fluidized-bed boiler according to claim 48, wherein said heat transfer surface means comprises heat transfer tubes which are installed in a radial pattern, said heat transfer tubes are divided into a plurality of blocks for use as a block of evaporating tubes, a block of steam superheating tubes and a block of steam reheating tubes.*

*56. The pressurized internal circulating fluidized-bed boiler according to claim 48, further comprising a dust collector provided in a passage of combustion gas discharged from said combustor for collecting flying ashes, and a classifier for recovering unreacted desulfurizing agent and unburned carbon from said ashes.*

*57. The pressurized internal circulating fluidized-bed boiler according to claim 56, wherein unreacted desulfurizing agent and unburned carbon recovered by said classifier are returned to one of said main combustion chamber and a fuel supplying system for supplying fuel.*

*58. The pressurized internal circulating fluidized-bed boiler according to claim 48, further comprising a dust*

*collector provided in a passage of combustion gas discharged from said combustor, wherein flying ashes caught by said dust collector are classified into three groups of larger, medium and smaller particle diameters, and only flying ashes of medium particle diameter are returned to at least one of said main combustion chamber, said free board and a fuel supplying system.*

*59. The pressurized internal circulating fluidized-bed boiler according to claim 37, wherein said thermal energy recovery chamber substantially surrounds said main fluidized bed combustion chamber.*

*60. The pressurized internal circulating fluidized-bed boiler according to claim 37, wherein the heat transfer surface means comprise heat transfer tubes immersed in the fluidized bed in said thermal energy recovery chamber and divided by function into blocks.*

*61. The pressurized internal circulating fluidized-bed boiler according to claim 60, wherein the amount of air from said air diffuser in said thermal energy recovery chamber can be adjusted in each of said blocks.*

*62. The pressurized internal circulating fluidized-bed boiler according to claim 37, wherein said heat transfer surface means comprise immersed heat transfer tubes installed in a radial pattern in plan view in said thermal energy recovery chamber.*

*63. The pressurized internal circulating fluidized-bed boiler according to claim 37, wherein said partition wall is an inclined partition wall.*

*64. The pressurized internal circulating fluidized-bed boiler according to claim 37, wherein said free board is provided integrally above said main combustion chamber and said thermal energy recovery chamber.*

*65. A pressurized cylindrical internal circulating fluidized-bed boiler comprising:*

*a pressure vessel;*

*a combustor disposed in said pressure vessel;*

*a main fluidized bed combustion chamber having an air diffusion device provided at the bottom of said combustor and adapted to inject fluidizing air upwardly under a mass flow that is at least greater at one side than that at another side;*

*a partition wall provided above a portion of said air diffusion device;*

*a thermal energy recovery chamber partitioned from said main combustion chamber by said partition wall;*

*a heat transfer surface means provided in said thermal energy recovery chamber for a passage of a heat receiving fluid therethrough;*

*an air diffuser provided at a lower portion of said thermal energy recovery chamber; and*

*a free board provided above said main combustion chamber and said thermal energy recovery chamber;*

*wherein said thermal energy recovery chamber is communicated at upper and lower portions thereof with said main fluidized bed combustion chamber, a moving bed is formed above a portion of said air diffusion device where the injected mass flow is smaller so that a fluidized medium descends and diffuses within the moving bed, and a circulating fluidized bed is formed above the portion of said air diffusion device where the mass flow of the fluidizing air is greater so that said fluidized medium is intensely fluidized and whirled towards a position above said moving bed and a part of said fluidized medium is introduced into said thermal energy recovery chamber beyond an upper portion of said partition wall, the formation of said moving bed and said circulating fluidized bed is effected by regulation of the amount of air injected upwardly from said air diffusion device in said main combustion chamber and regulation of the fluidizing air injected from said air diffuser in said thermal energy recovery chamber causes the fluidized medium within said thermal energy recovery chamber to descend in a state of a moving bed for circulation to said main combustion chamber, and combustion gas from said main combustion chamber and said thermal energy recovery chamber is mixed in said free board.*

*66. The pressurized internal circulating fluidized-bed boiler according to claim 65, further comprising at least one secondary air supplying nozzle for supplying a secondary air into said free board so that combustion gas from said main combustion chamber and said thermal energy recovery chamber is mixed and unburned combustible materials in said combustion gas are combusted.*

*67. The pressurized internal circulating fluidized-bed boiler according to claim 66, further comprising an air supplying system for controlling an amount of combustion air to combust fuel at a predetermined air ratio in accordance with an amount of the fuel to be supplied while maintaining oxygen concentration at a predetermined rate in exhaust gas discharged from said combustor, wherein by said air supplying system, the remaining amount of air is determined by subtracting an amount of air to be supplied to said air diffuser in said thermal energy recovery chamber from the amount of combustion air and the remaining amount of air is divided into an amount of air to be supplied to said air diffusion device in said main combustion chamber and an amount of air to be supplied to said free board as secondary air.*

*68. The pressurized internal circulating fluidized-bed boiler according to claim 67, wherein the amount of air to be supplied to said main combustion chamber is controlled so as to be less than a stoichiometric air flow rate.*

*69. The pressurized internal circulating fluidized-bed boiler according to claim 65, further comprising screening means provided between said main combustion chamber and said thermal energy recovery chamber for preventing combustible materials having a large grain size from entering said thermal energy recovery chamber, and for allowing combustion gas from said thermal energy recovery chamber to pass therethrough while regulating a stream of the combustion gas and mixing with combustion gas from said main combustion chamber.*

*70. The pressurized internal circulating fluidized-bed boiler according to claim 65, further comprising a baffle provided in said free board, wherein said baffle is positioned upstream of a combustion gas outlet of said combustor to prevent a short-pass of combustion gas.*

*71. The pressurized internal circulating fluidized-bed boiler according to claim 65, further comprising a gas turbine driven by combustion gas of said combustor, wherein exhaust gas discharged from said gas turbine is mixed with combustion air to be supplied to said combustor.*

*72. The pressurized internal circulating fluidized-bed boiler according to claim 65, further comprising an equalizing nozzle for supplying a pressurized gas to a space between said pressure vessel and said combustor to balance inwardly and outwardly of said combustor.*

*73. The pressurized internal circulating fluidized-bed boiler according to claim 65, further comprising a dust collector provided in a passage of combustion gas discharged from said combustor, wherein flying ashes caught by said dust collector are classified into three groups of*

*larger, medium and smaller particle diameters, and only flying ashes of medium particle diameter are returned to at least one of said main combustion chamber, said free board and a fuel supplying system for supplying fuel.*

*74. The pressurized internal circulating fluidized-bed boiler according to claim 65, further comprising a dust collector provided in a passage of combustion gas discharged from said combustor, wherein flying ashes caught by said dust collector are returned to said thermal energy recovery chamber through an opening formed in said pressure vessel.*

*75. The pressurized internal circulating fluidized-bed boiler according to claim 65, further comprising a dust collector provided in a passage of combustion gas discharged from said combustor, wherein flying ashes caught by said dust collector are returned to at least one of said main combustion chamber and said free board through an opening formed in said pressure vessel.*

*76. A pressurized internal circulating fluidized-bed boiler according to claim 65, wherein said partition has a cylindrical partition and a conical partition formed at an upper portion of said cylindrical partition, said conical partition being provided above a portion of said air diffusion device where the mass flow is greater so as to interfere with the upward flow of the fluidizing air and thereby to deflect the air towards a portion above a central part of said air diffusion device where the mass flow is smaller, and wherein said thermal energy recovery chamber partitioned from said main combustion chamber by said partition is annular.*

*77. The pressurized internal circulating fluidized-bed boiler according to claim 76, wherein said air diffusion device is provided on a bottom face of said main combustion chamber, and said bottom face is conical in shape.*

*78. The pressurized internal circulating fluidized-bed boiler according to claim 77, wherein a fuel inlet for supplying fuel to said main combustion chamber is provided in the vicinity of said bottom face of said main combustion chamber.*

*79. The pressurized internal circulating fluidized-bed boiler according to claim 76, wherein said free board is provided integrally above said main combustion chamber and said thermal energy recovery chamber.*

*80. The pressurized internal circulating fluidized-bed boiler according to claim 79, further comprising a dust collector provided in a passage of combustion gas discharged from said combustor, wherein flying ashes caught by said dust collector are mixed with secondary air, and a mixture of said flying ashes and said secondary air is supplied to said free board through an opening formed in said pressure vessel.*

*81. The pressurized internal circulating fluidized-bed boiler according to claim 76, wherein said air diffuser is provided on a bottom face of said thermal energy recovery chamber, said bottom face is inclined inwardly toward said main combustion chamber, and a lowermost bottom face of said thermal energy recovery chamber faces a connection opening for returning fluidized medium from said thermal energy recovery chamber to said main combustion chamber.*

*82. The pressurized internal circulating fluidized-bed boiler according to claim 81, further comprising an air diffuser provided at said connection opening for enabling fluidized medium to be fluidized in said connecting opening.*

*83. The pressurized internal circulating fluidized-bed boiler according to claim 76, wherein said heat transfer surface means comprises heat transfer tubes which are installed in a radial pattern, said heat transfer tubes are divided into a plurality of blocks for use as a block of evaporating tubes, a block of steam superheating tubes and a block of steam reheating tubes.*

*84. The pressurized internal circulating fluidized-bed boiler according to claim 76, further comprising a dust collector provided in a passage of combustion gas discharged from said combustor for collecting flying ashes, and a classifier for recovering unreacted desulfurizing agent and unburned carbon from said ashes.*

*85. The pressurized internal circulating fluidized-bed boiler according to claim 84, wherein unreacted desulfurizing agent and unburned carbon recovered by said classifier are returned to one of said main combustion chamber and a fuel supplying system for supplying fuel.*

*86. The pressurized internal circulating fluidized-bed boiler according to claim 76, further comprising a dust collector provided in a passage of combustion gas discharged from said combustor, wherein flying ashes caught by said dust collector are classified into three groups of larger, medium and smaller particle diameters, and only flying ashes of medium particle diameter are returned to at least one of said main combustion chamber, said free board and a fuel supplying system for supplying fuel.*

*87. The pressurized internal circulating fluidized-bed boiler according to claim 65, wherein said thermal energy recovery chamber substantially surrounds said main fluidized bed combustion chamber.*

*88. The pressurized internal circulating fluidized-bed boiler according to claim 65, wherein the heat transfer surface means comprise heat transfer tubes immersed in the fluidized bed in said thermal energy recovery chamber and divided by function into blocks.*

*89. The pressurized internal circulating fluidized-bed boiler according to claim 88, wherein the amount of air from said air diffuser in said thermal energy recovery chamber can be adjusted in each of said blocks.*

*90. The pressurized internal circulating fluidized-bed boiler according to claim 65, wherein said heat transfer surface means comprise immersed heat transfer tubes installed in a radial pattern in plan view in said thermal energy recovery chamber.*

*91. The pressurized internal circulating fluidized-bed boiler according to claim 65, wherein said partition wall is an inclined partition wall.*

*92. The pressurized internal circulating fluidized-bed boiler according to claim 65, wherein said free board is provided integrally above said main combustion chamber and said thermal energy recovery chamber.*

* * * * *